(12) United States Patent
Zhang et al.

(10) Patent No.: US 10,266,263 B2
(45) Date of Patent: Apr. 23, 2019

(54) SYSTEM AND METHOD FOR OMNI-DIRECTIONAL OBSTACLE AVOIDANCE IN AERIAL SYSTEMS

(71) Applicant: Hangzhou Zero Zero Technology Co., Ltd., HangZhou, Zhejiang (CN)

(72) Inventors: Tong Zhang, HangZhou (CN); Mengwen Tan, HangZhou (CN); Mengqiu Wang, HangZhou (CN); Jia Lu, HangZhou (CN); Hanqing Guo, HangZhou (CN)

(73) Assignee: HANGZHOU ZERO ZERO TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 15/876,467

(22) Filed: Jan. 22, 2018

(65) Prior Publication Data
US 2018/0208311 A1 Jul. 26, 2018

Related U.S. Application Data

(60) Provisional application No. 62/486,230, filed on Apr. 17, 2017, provisional application No. 62/449,476, filed on Jan. 23, 2017.

(51) Int. Cl.
*B64C 39/02* (2006.01)
*G02B 13/00* (2006.01)
(Continued)

(52) U.S. Cl.
CPC ........ *B64C 39/024* (2013.01); *G02B 13/0015* (2013.01); *G02B 27/0075* (2013.01);
(Continued)

(58) Field of Classification Search
CPC .................. B64C 39/024; G02B 13/0015
See application file for complete search history.

(56) References Cited

U.S. PATENT DOCUMENTS 9,720,413 B1 * 8/2017 Lema ................... G05D 1/0088
2006/0105299 A1 * 5/2006 Ferris ..................... G09B 19/00
434/11
(Continued)

FOREIGN PATENT DOCUMENTS

| CN | 204527663 U | 8/2015 |
| CN | 105759535 A | 7/2016 |
| CN | 106303240 A | 1/2017 |

OTHER PUBLICATIONS

International Search Report and Written Opinion (International Application No. PCT/IB2018/050384; O/R: dated Apr. 28, 2018.

*Primary Examiner* — Tracy Y. Li
(74) *Attorney, Agent, or Firm* — Howard & Howard Attorneys PLLC

(57) ABSTRACT

An aerial system having an obstacle detection and avoidance system is described herein. The obstacle detection and avoidance system includes a pair of ultra-wide angle lens cameras orientated coaxially along an optical axis. Each ultra-wide angle lens camera includes a field-of-view lens having a vertical angle of view greater than 180 degrees. The pair of ultra-wide angle lens cameras is orientated such that a portion of each corresponding camera field-of-view overlaps to define a viewable region of interest including overlapping vertical field angle.

20 Claims, 20 Drawing Sheets

(51) Int. Cl.
*G02B 27/00* (2006.01)
*H04N 5/232* (2006.01)
*H04N 5/225* (2006.01)

(52) U.S. Cl.
CPC ....... *H04N 5/2252* (2013.01); *H04N 5/23238* (2013.01); *B64C 2201/141* (2013.01)

(56) References Cited

U.S. PATENT DOCUMENTS

2007/0200933 A1 8/2007 Watanabe et al.
2014/0055613 A1 2/2014 Ohtomo et al.
2016/0029008 A1* 1/2016 Prechtl .................... G06T 7/593
 348/48
2016/0295108 A1* 10/2016 Cao .................... H04N 5/23238

* cited by examiner

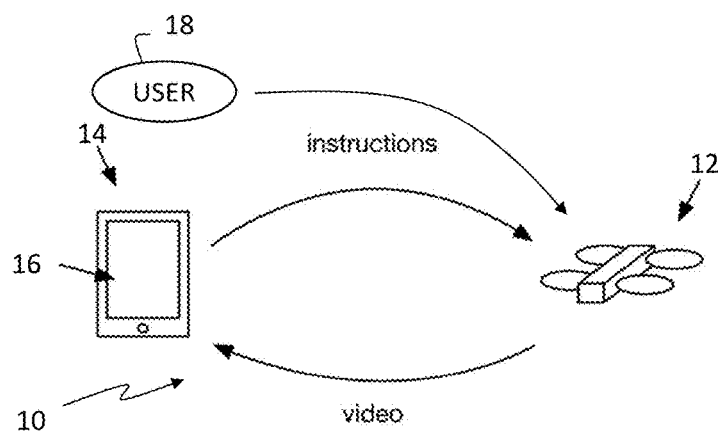
FIG. 1
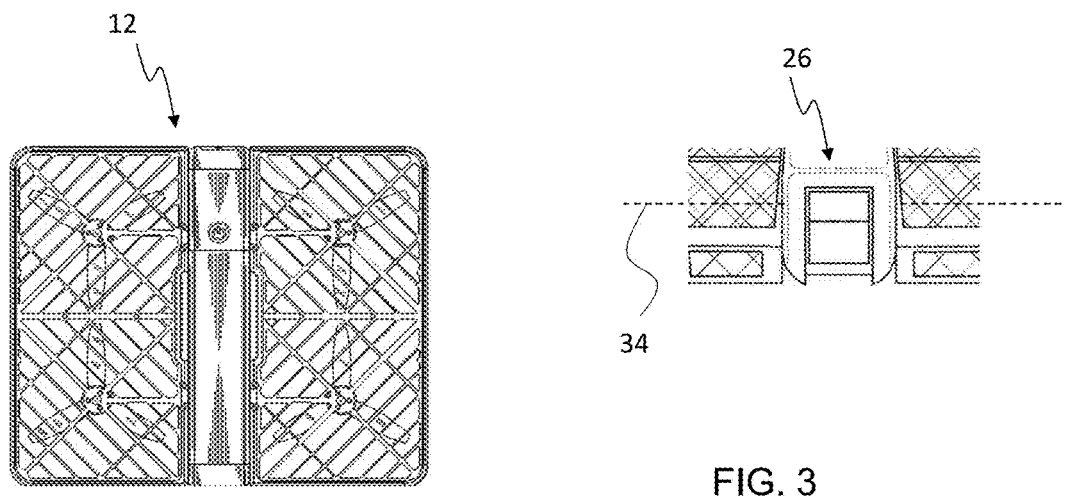
FIG. 2
FIG. 3

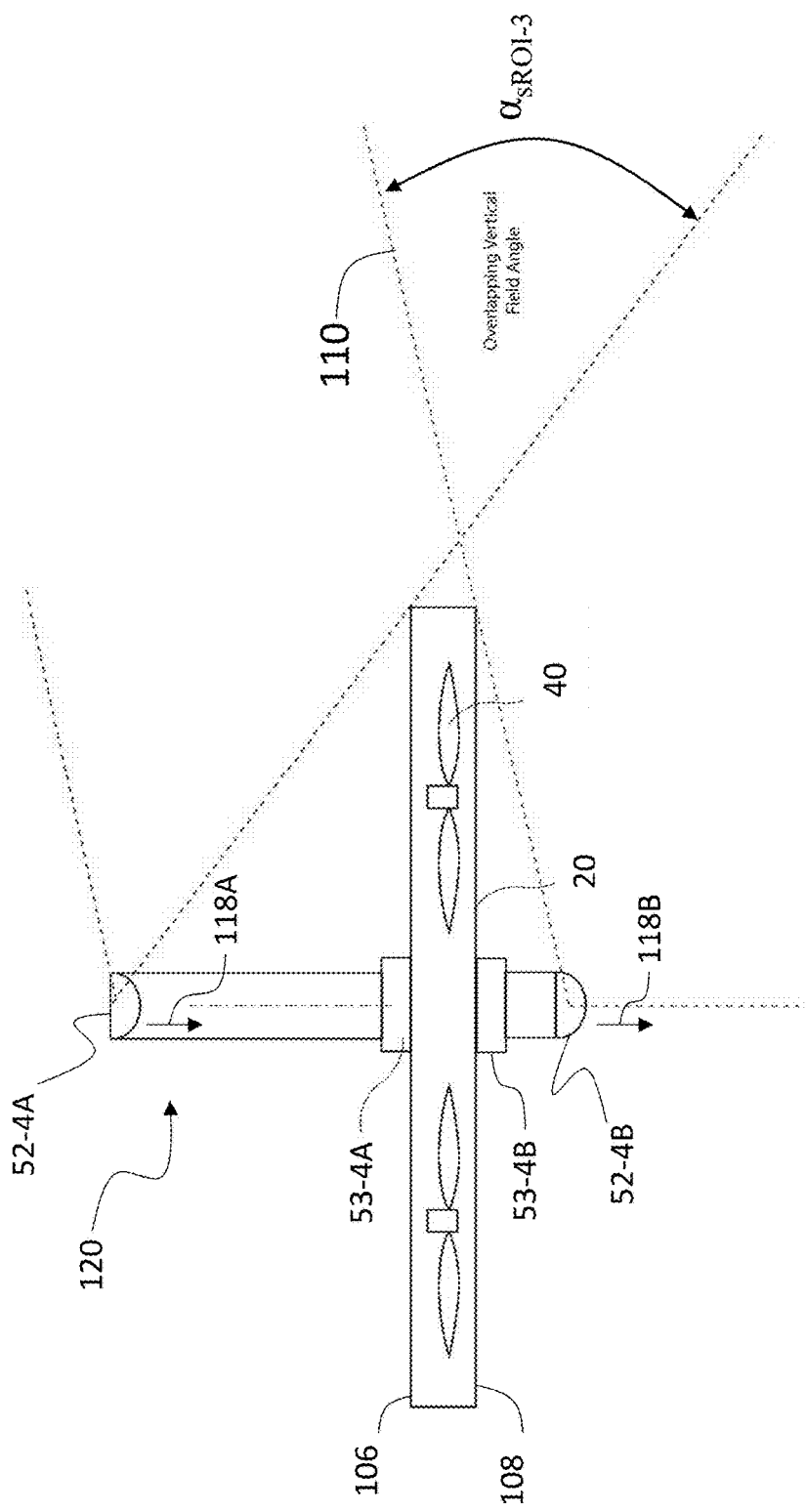

FIG. 22
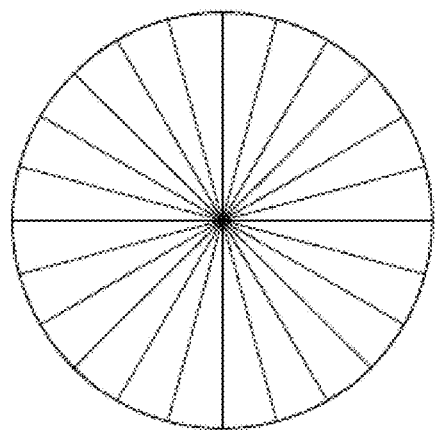 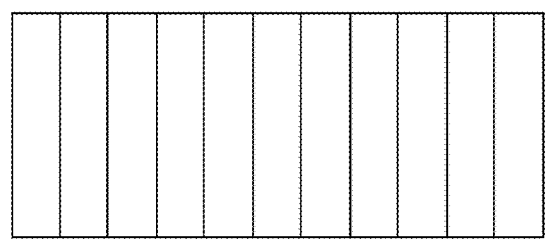
FIG. 23A  FIG. 23B

SYSTEM AND METHOD FOR OMNI-DIRECTIONAL OBSTACLE AVOIDANCE IN AERIAL SYSTEMS

CROSS-REFERENCE TO RELATED APPLICATION

This application claims priority to U.S. Provisional Patent Application Ser. No. 62/449,476, filed on Jan. 23, 2017, and claims priority to U.S. Provisional Patent Application Ser. No. 62/486,230, filed on Apr. 17, 2017, all of which are hereby incorporated by reference in their entirety for all purposes.

TECHNICAL FIELD

This invention relates generally to the aerial system field, and more specifically, to a system and method for providing omnidirectional depth sensing and obstacle avoidance in aerial systems.

BACKGROUND OF THE INVENTION

Depth sensing and obstacle avoidance is a key step toward building a fully autonomous aerial robot. Currently existing drones have demonstrated using sonar, proximity sensor, laser scanning range finder, time-of-flight based sensor, structural light based sensor or a stereovision camera pair to perform depth sensing toward one particular direction (forward/downward), or using multiple depth sensors (such as stereovision camera pairs) facing different directions to attempt obstacle avoidance in more directions. However, the fundamental flaw of this approach is that a rotary-wing drone (such as quadcopter, etc.), unlike a car or a ship, is capable of driving in all directions. A stereovision pairs can only cover a limited range of driving angles. Using brute force to stacking multiple stereovision pairs is very inefficient, and can still fail in obstacle avoidance due to lack of full coverage (360 degrees) of horizontal field angle for depth sensing. Another existing attempt was to use a wide-angle lens or catadioptric lens to capture omnidirectional video information and then using techniques like structure from motion (SFM) or visual inertial odometry (VIO) to achieve single camera depth sensing. This approach relies on extremely accurate SFM/VIO in order to obtain usable absolute depth information. And it is very vulnerable to vibration and angular movement of the system, which occurs almost constantly on a drone. Recently, an omnistereo system based on the folded, catadioptric configuration with hyperboloidal mirrors is demonstrated, using only one camera sensor to achieve single frame omnidirectional depth sensing. It is indeed a cost-effective solution, however, a decent depth sensing resolution from this design preferably requires a camera sensor with very high resolution at least 3-5M pixel and global shutter, sophisticated fish-eye lens and high precision reflective mirror components, which limits its potential in terms of costs.

The present invention is aimed at one or more of the problems identified above.

SUMMARY OF THE INVENTION

In different embodiments of the present invention, systems and methods for operating and assembling an aerial system having an obstacle detection and avoidance system, is provided.

In one embodiment of the present invention, an aerial system is provided. The aerial system includes a fuselage body, a lift mechanism coupled to the fuselage body, and an obstacle detection system coupled to the fuselage body. The obstacle detection system includes a pair of ultra-wide angle lens cameras. Each ultra-wide angle lens camera includes a field-of-view lens having a vertical angle of view greater than 180 degrees. The pair of ultra-wide angle lens cameras is orientated such that a portion of each corresponding camera field-of-view overlaps to define a viewable region of interest including overlapping vertical field angle.

In another embodiment of the present invention, an obstacle detection system for use with an aerial system including a fuselage body and a lift mechanism is provided. The obstacle detection system includes a support assembly adapted to be coupled to the fuselage body and a pair of ultra-wide angle lens cameras coupled to the support assembly. The pair of ultra-wide angle lens cameras orientated coaxially along an optical axis. Each ultra-wide angle lens camera includes a field-of-view lens having a vertical angle of view greater than 180 degrees. The pair of ultra-wide angle lens cameras is orientated such that a portion of each corresponding camera field-of-view overlaps to define a viewable region of interest including overlapping vertical field angle.

In yet another embodiment of the present invention, an aerial system is provided. The aerial system includes a fuselage body, a lift mechanism coupled to the fuselage body, and an obstacle detection system. The obstacle detection system includes a support assembly coupled to the fuselage body, a pair of ultra-wide angle lens cameras coupled to the support assembly, and a processor coupled to the pair of ultra-wide angle lens cameras. The pair of ultra-wide angle lens cameras are orientated coaxially along an optical axis. Each ultra-wide angle lens camera includes a field-of-view lens having a vertical angle of view greater than 180 degrees. The pair of ultra-wide angle lens cameras is orientated such that a portion of each corresponding camera field-of-view overlaps to define a viewable region of interest including overlapping vertical field angle. The processor is programmed to receive video image data from each of the ultra-wide angle lens cameras and generate circular video images associated with each ultra-wide angle lens camera. The processor generates panoramic video images based on the generated circular video images including a first panoramic image associated with a first camera of the pair of ultra-wide angle lens cameras and a second panoramic image associated with a second camera of the pair of ultra-wide angle lens cameras. The processor determines corresponding object image points within the first panoramic image and the second panoramic image and determines a distance of each corresponding object image point from the optical axis. The processor determines a trajectory based on the distance of each corresponding object image point from the optical axis and operates the lift mechanism to move the aerial system along the determined trajectory.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings.

FIG. 1 is a schematic representation of an aerial system and a system for controlling the aerial system, according to an embodiment of the present invention.

FIG. 2 is a picture of a top view of an exemplary aerial system, according to an embodiment of the present invention.

FIG. 3 is a picture of a perspective view of an exemplary optical system that may be used with the aerial system shown in FIG. 2, according to an embodiment of the present invention.

FIG. 15 is a diagrammatic illustration of a top view of a portion of the obstacle detection and avoidance system of FIG. 13.

FIG. 19 is a diagrammatic illustration of an aerial system including an obstacle detection and avoidance system, according to a third alternative embodiment of the present invention.

FIG. 22 is an exemplary fish-eye image including a circular image.

FIG. 23A illustrates the epipolar lines for a pair of coaxial omnidirectional images are radial lines.

FIG. 23B illustrates when the images are projected onto a panorama the epipolar lines become parallel.

Figure 4:
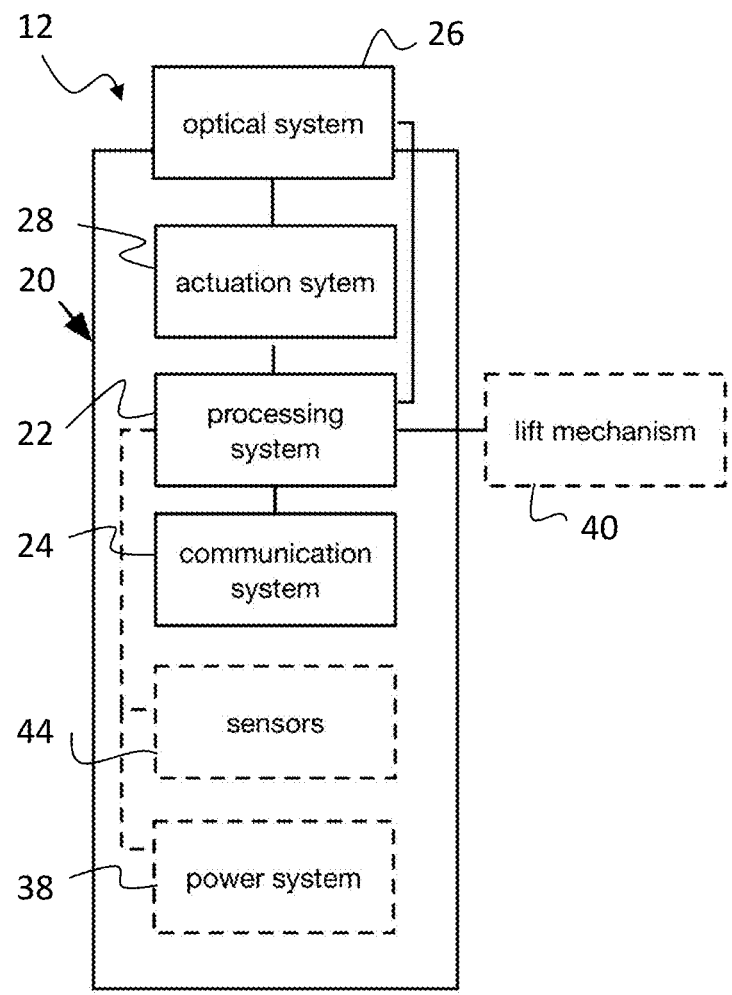
FIG. 4 is a second schematic representation of the aerial system, according to an embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION OF THE INVENTION

The following description of the embodiments of the invention is not intended to limit the invention to these embodiments, but rather to enable any person skilled in the art to make and use this invention. With reference to the drawings and in operation, system 10 for controlling an aerial system 12, for example a drone, is provided. The system 10 may include a remote device 14 with a control client 16. The control client 16 provides a user interface (see below) that allows a user 18 to send instructions to the aerial system 12 to control operation thereof. As discussed in more depth below, the aerial system 12 includes one or more cameras (see below) for obtaining pictures and/or video which may be sent to the remote device 14 and/or stored in memory on the aerial system 12.

Figure 6:
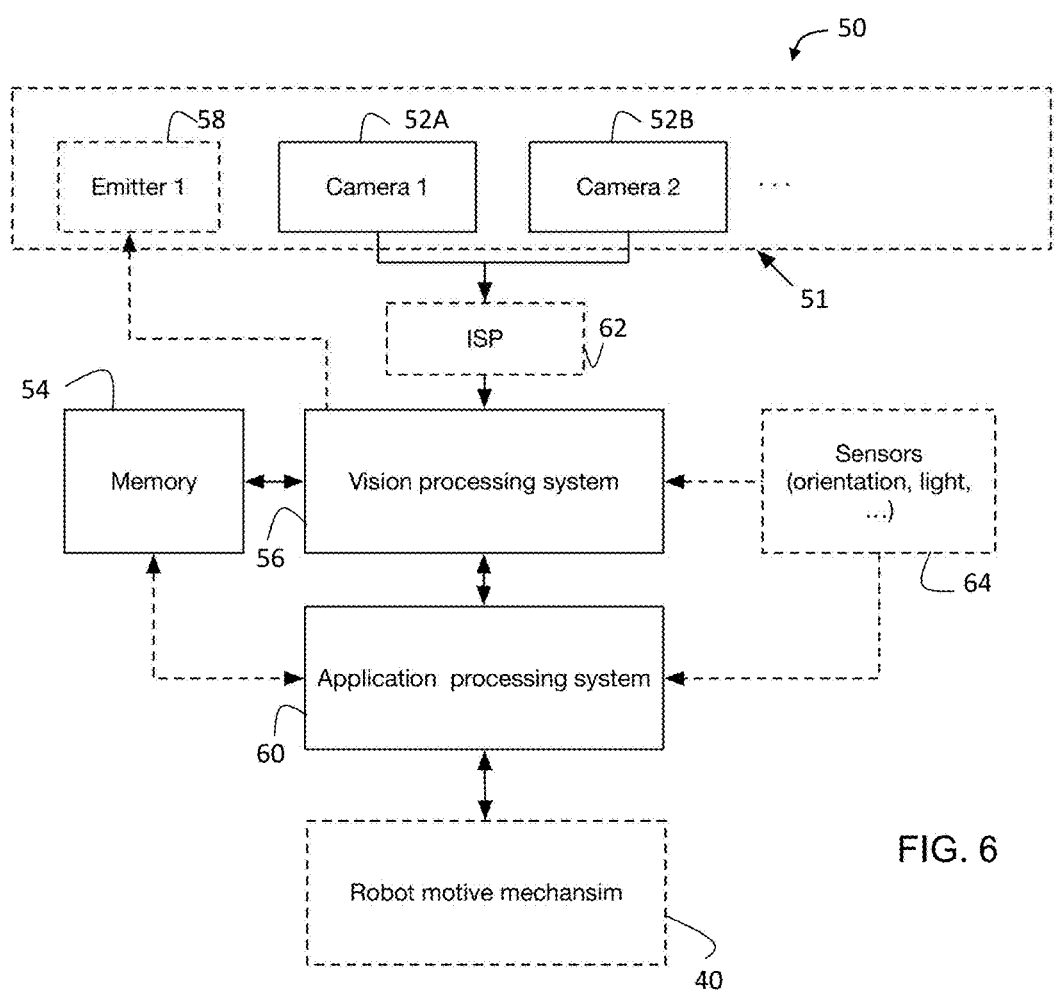
FIG. 6 is a schematic representation of an aerial system including an obstacle detection and avoidance system, according to an embodiment of the present invention.

In one aspect of the present invention, the aerial system 12 may include an obstacle detection and avoidance unit 50 (shown in FIG. 6). The obstacle detection and avoidance unit 50 may include an imaging system 51 that includes a pair of ultra-wide angle lens cameras including a first ultra-wide angle lens cameras 52A and a second ultra-wide angle lens cameras 52B that are utilized to provide obstacle detection and avoidance (see below).

The aerial system 12 may include one or more sensors (see below) for detecting or sensing operations or actions, i.e., expressions, performed by the user 18 to control operation of the aerial system 12 (see below) without direct or physical interaction with the remote device 14. In controller-free embodiments, the entire control loop from start (release and hover) to finish (grab and go), as well as controlling motion of the aerial system 12 and trigger of events, e.g., taking pictures and video, are performed solely on board the aerial system 12 without involvement of the remote device 14. In some such embodiments or systems 10, a remote device 14 may not be provided or included.

In some embodiments, the remote device 14 includes one or more sensors that detect or sense operation or actions performed by the user 18 to control operation of the aerial system 12 without physical interaction with the remote device 14 under certain conditions, for example, when the aerial system 12 is too far from the user 18.

Overview of the System 10 and the Aerial System 12.

An exemplary aerial system 12 and control system is shown in FIGS. 1-5. The control client 16 of the aerial system 12 functions to receive data from the aerial system 12, including video images and/or video, and control visual display on the remote device 14. The control client 16 may also receive operation instructions and facilitate aerial system 12 remote control based on operation instructions. The control client 16 is preferably configured to execute on a remote device 14, but can alternatively be configured to execute on the aerial system 12 or on any other suitable system. As discussed above, and more fully below, the aerial system 12 may be controlled solely without direct or physical interaction with the remote device 14.

The control client 16 can be a native application (e.g., a mobile application), a browser application, an operating system application, or be any other suitable construct.

The remote device 14 executing the control client 16 functions to display the data (e.g., as instructed by the control client 16), receive user inputs, compute the operation instructions based on the user inputs (e.g., as instructed by the control client 16), send operation instructions to the aerial system 12, store control client information (e.g., associated aerial system identifiers, security keys, user account information, user account preferences, etc.), or perform any other suitable functionality. The remote device 14 can be a user device (e.g., smartphone, tablet, laptop, etc.), a networked server system, or be any other suitable remote computing system. The remote device 14 can include one or more: outputs, inputs, communication systems, sensors, power sources, processing systems (e.g., CPU, memory, etc.), or any other suitable component. Outputs can include: displays (e.g., LED display, OLED display, LCD, etc.), audio speakers, lights (e.g., LEDs), tactile outputs (e.g., a tixel system, vibratory motors, etc.), or any other suitable output. Inputs can include: touchscreens (e.g., capacitive, resistive, etc.), a mouse, a keyboard, a motion sensor, a microphone, a biometric input, a camera, or any other suitable input. Communication systems can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system. Sensors can include: orientation sensors (e.g., accelerometer, gyroscope, etc.), ambient light sensors, temperature sensors, pressure sensors, optical sensors, acoustic sensors, or any other suitable sensor. In one variation, the remote device 14 can include a display (e.g., a touch-sensitive display including a touchscreen overlaying the display), a set of radios (e.g., Wi-Fi, cellular, BLE, etc.), and a set of orientation sensors. However, the remote device 14 can include any suitable set of components.

The aerial system 12 functions to fly within a physical space, capture video, stream the video in near-real time to the remote device 14, and operate based on operation instructions received from the remote device 14.

The aerial system 12 can additionally process the video (e.g., video frames) prior to streaming the video to the remote device 14 and/or audio received from an onboard audio sensor; generate and automatically operate based on its own operation instructions (e.g., to automatically follow a subject); or perform any other suitable functionality. The aerial system 12 can additionally function to move the optical sensor's field of view within the physical space. For example, the aerial system 12 can control macro movements (e.g., large FOV changes, on the order of meter adjustments), micro movements (e.g., small FOV changes, on the order of millimeter or centimeter adjustments), or any other suitable movement.

The aerial system 12 can perform certain functionality based on onboard processing of sensor data from onboard sensors. This functionality may include, but is not limited to:
  Take-off and landing;
  Owner recognition;
  Facial recognition;
  Speech recognition;
  Facial expression and gesture recognition; and,
  Control, e.g., motion, of the aerial system based on owner, facial, expression and gesture recognition, and speech recognition.

As shown in FIGS. 2-5, the aerial system 12 (e.g., drone) can include a fuselage body 20, a processing system 22, a communication system 24, an optical system 26, and an actuation mechanism 28 mounting the optical system 26 to the body 20. The aerial system 12 can additionally or alternatively include lift mechanisms, sensors, power system, or any other suitable component (see below).

The body 20 of the aerial system 12 functions to mechanically protect and/or retain the aerial system components. The body 20 can define a lumen, be a platform, or have any suitable configuration. The body 20 can be enclosed, open (e.g., a truss), or have any suitable construction. The body 20 can be made of metal, plastic (e.g., polymer), carbon composite, or any other suitable material. The body 20 can define a longitudinal axis 100, a lateral axis 102, a transverse axis 104 (shown in FIG. 5 and FIG. 16), a front end, a back end (e.g., opposing the front end along the longitudinal axis 100), a top portion 106, a bottom portion 108 (e.g., opposing the top along the transverse axis 104), or any other suitable reference. In one variation, while in flight, a transverse axis of the body 20 can be substantially parallel a gravity vector (e.g., perpendicular a ground plane) and the body's longitudinal and lateral axes can be substantially perpendicular the gravity vector (e.g., parallel the ground plane). However, the body 20 can be otherwise configured.

The processing system 22 of the aerial system 12 functions to control aerial system operation. The processing system 22 can: receive operation instructions from the communication system 24, interpret the operation instructions into machine instructions, and control aerial system components based on the machine instructions (individually or as a set). The processing system 22 can additionally or alternatively process the images recorded by the camera, stream images to the remote device 14 (e.g., in real- or near-real time), or perform any other suitable functionality. The processing system 22 can include one or more: processors 30 (e.g., CPU, GPU, etc.), memory (e.g., Flash, RAM, etc.), or any other suitable processing component. In one variation, the processing system 22 can additionally include dedicated hardware that automatically processes the images (e.g., de-warps the image, filters the image, crops the image, etc.) prior to transmission to the remote device 14. The processing system 22 is preferably connected to the active components of the aerial system 12 and mounted to the body 20, but can alternatively be otherwise related to aerial system components.

The communication system 24 of the aerial system functions to send and/or receive information from the remote device 14. The communication system 24 is preferably connected to the processing system 22, such that the communication system 24 sends and/or receives data form the processing system 22, but can alternatively be connected to any other suitable component. The aerial system 12 can include one or more communication systems 24 of one or more types. The communication system 24 can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system 24. The communication system 24 preferably shares at least one system protocol (e.g., BLE, RF, etc.) with the remote device 14, but can alternatively communicate with the remote device 14 via an intermediary communication system (e.g., a protocol translation system). However, the communication system 24 can be otherwise configured.

The optical system 26 of the aerial system 12 functions to record images of the physical space proximal the aerial system 12. The optical system 26 is preferably mounted to the body 20 via the actuation mechanism 28, but can alternatively be statically mounted to the body 20, removably mounted to the body 20, or otherwise mounted to the body 20. The optical system 26 is preferably mounted to the front end of the body 20, but can optionally be mounted to the bottom (e.g., proximal the front), top, back end, or any other suitable portion of the body 20. The optical system 26 is preferably connected to the processing system 22, but can alternatively be connected to the communication system 24 or to any other suitable system. The optical system 26 can additionally include dedicated image processing hardware that automatically processes images recorded by the camera prior to transmission to the processor or other endpoint. The aerial system 12 can include one or more optical systems 26 of same or different type, mounted to the same or different position. In one variation, the aerial system 12 includes a first optical system 26, mounted to the front end of the body 20, and a second optical system 26, mounted to the bottom of the body 20. The first optical system 26 can actuate about a pivotal support, and the second optical system 26 can be substantially statically retained relative to the body 20, with the respective active surface substantially parallel the body bottom. The first optical system 26 may include a high definition optical sensor, while the second optical system 26 may include a low definition optical sensor. However, the optical system 26 can be otherwise configured.

Figure 5:
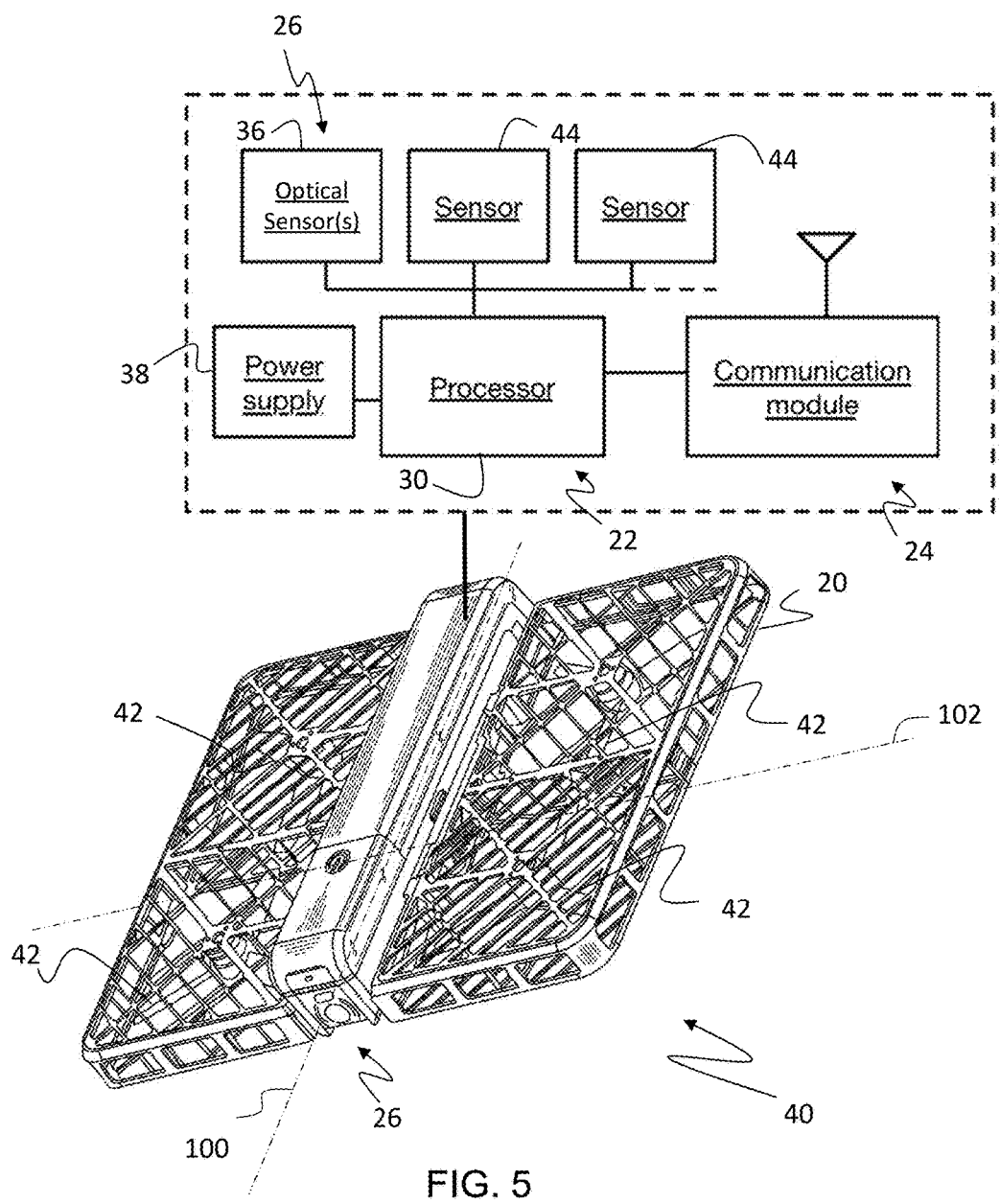
FIG. 5 is a third schematic representation of the system for controlling the aerial system and the aerial system according to an embodiment of the present invention.

The optical system 26 can include one or more optical sensors 36 (see FIG. 5). The one or more optical sensors 36 can include: a single lens camera (e.g., CCD camera, CMOS camera, etc.), a stereo-camera, a hyperspectral camera, a multispectral camera, or any other suitable image sensor. However, the optical system 26 can be any other suitable optical system 26. The optical system 26 can define one or more active surfaces that receive light, but can alternatively include any other suitable component. For example, an active surface of a camera can be an active surface of a camera sensor (e.g., CCD sensor, CMOS sensor, etc.), preferably including a regular array of sensor pixels. The camera sensor or other active surface is preferably substantially planar and rectangular (e.g., having a first sensor edge, a second sensor edge opposing the first sensor edge, and third and fourth sensor edges each perpendicular to and extending from the first sensor edge to the second sensor edge), but can alternatively have any suitable shape and/or topography. The optical sensor 36 can produce an image frame. The image frame preferably corresponds with the shape of the active surface (e.g., rectangular, having a first and second frame edge opposing each other, etc.), more preferably defining a regular array of pixel locations, each pixel location corresponding to a sensor pixel of the active surface and/or pixels of the images sampled by the optical sensor 36, but can alternatively have any suitable shape. The image frame preferably defines aspects of the images sampled by the optical sensor 36 (e.g., image dimensions, resolution, pixel size and/or shape, etc.). The optical sensor 36 can optionally include a zoom lens, digital zoom, fish-eye lens, filter, or any other suitable active or passive optical adjustment. Application of the optical adjustment can be actively controlled by the controller, manually controlled by the user 18 (e.g., wherein the user manually sets the adjustment), controlled by the remote device 14, or otherwise controlled. In one variation, the optical system 26 can include a housing enclosing the remainder of the optical system components, wherein the housing is mounted to the body 20. However, the optical system 26 can be otherwise configured.

The actuation mechanism 28 of the aerial system 12 functions to actionably mount the optical system 26 to the body 20. The actuation mechanism 28 can additionally function to dampen optical sensor vibration (e.g., mechanically stabilize the resultant image), accommodate for aerial system roll, or perform any other suitable functionality. The actuation mechanism 28 can be active (e.g., controlled by the processing system), passive (e.g., controlled by a set of weights, spring elements, magnetic elements, etc.), or otherwise controlled. The actuation mechanism 28 can rotate the optical system 26 about one or more axes relative to the body, translate the optical system 26 along one or more axes relative to the body, or otherwise actuate the optical system 26. The optical sensor(s) 36 can be mounted to the support along a first end, along an optical sensor back (e.g., opposing the active surface), through the optical sensor body, or along any other suitable portion of the optical sensor 36.

In one variation, the actuation mechanism 28 can include a motor (not shown) connected to a single pivoted support (e.g., gimbal), wherein the motor pivots the support about the rotational (or gimbal) axis 34 (shown in FIG. 3) based on instructions received from the controller. The support is preferably arranged with the rotational axis substantially parallel the lateral axis of the body 20, but can alternatively be arranged with the rotational axis at any other suitable orientation relative to the body 20. The support is preferably arranged within a recessed cavity defined by the body 20, wherein the cavity further encompasses the optical sensor 36 but can alternatively be arranged along the body exterior or arranged at any other suitable portion of the body 20. The optical sensor 36 is preferably mounted to the support with the active surface substantially parallel the rotational axis (e.g., with the lateral axis, or axis parallel the lateral axis of the body 20, substantially parallel the rotational axis), but can alternatively be arranged with the active surface arranged at any suitable angle to the rotational axis.

The motor is preferably an electric motor, but can alternatively be any other suitable motor. Examples of electric motors that can be used include: DC motors (e.g., brushed motors), EC motors (e.g., brushless motors), induction motor, synchronous motor, magnetic motor, or any other suitable electric motor. The motor is preferably mounted to the body 20 (e.g., the body interior), electrically connected to and controlled by the processing system 22, and electrically connected to and powered by a power source or system 38. However, the motor can be otherwise connected. The actuation mechanism 28 preferably includes a single motor-support set, but can alternatively include multiple motor-support sets, wherein auxiliary motor-support sets can be arranged orthogonal (or at any other suitable angle to) the first motor-support set.

In a second variation, the actuation mechanism 28 can include a set of pivoted supports and weights connected to the optical sensor 36 offset from the optical sensor center of gravity, wherein the actuation mechanism 28 passively stabilizes the optical sensor 36.

A lift mechanism 40 of the aerial system 12 functions to enable aerial system flight. The lift mechanism 40 preferably includes a set propeller blades 42 driven by a motor (not shown), but can alternatively include any other suitable propulsion mechanism. The lift mechanism 40 is preferably mounted to the body 20 and controlled by the processing system 22, but can alternatively be otherwise mounted to the aerial system 12 and/or controlled. The aerial system 12 can include multiple lift mechanisms 40. In one example, the aerial system 12 includes four lift mechanisms 40 (e.g., two pairs of lift mechanisms 40), wherein the lift mechanisms 40 are substantially evenly distributed about the perimeter of the aerial system 12 (e.g., wherein the lift mechanisms 40 of each pair oppose each other across the body 20). However, the lift mechanisms 40 can be otherwise configured.

Additional sensors 44 of the aerial system function to record signals indicative of aerial system operation, the ambient environment surrounding the aerial system 12 (e.g., the physical space proximal the aerial system 12), or any other suitable parameter. The sensors 44 are preferably mounted to the body 20 and controlled by the processing system 22, but can alternatively be mounted to any other suitable component and/or otherwise controlled. The aerial system 12 can include one or more sensors 36, 44. Examples of sensors that can be used include: orientation sensors (e.g., accelerometer, gyroscope, etc.), ambient light sensors, temperature sensors, pressure sensors, optical sensors, acoustic sensors (e.g., microphones), voltage sensors, current sensors, or any other suitable sensor.

The power supply 38 of the aerial system 12 functions to power the active components of the aerial system 12. The power supply 38 is preferably mounted to the body 20, and electrically connected to all active components of the aerial system 12 (e.g., directly or indirectly), but can be otherwise arranged. The power supply 38 can be a primary battery, secondary battery (e.g., rechargeable battery), fuel cell, energy harvester (e.g., solar, wind, etc.), or be any other suitable power supply. Examples of secondary batteries that can be used include: a lithium chemistry (e.g., lithium ion, lithium ion polymer, etc.), nickel chemistry (e.g., NiCad, NiMH, etc.), or batteries with any other suitable chemistry.

The aerial system(s) 12, and can optionally be used with a remote computing system, or with any other suitable system. The aerial system 12 functions to fly, and can additionally function to take photographs, deliver loads, and/or relay wireless communications. The aerial system 12 is preferably a rotorcraft (e.g., quadcopter, helicopter, cyclocopter, etc.), but can alternatively be a fixed-wing aircraft, aerostat, or be any other suitable aerial system 12. The aerial system 12 can include a lift mechanism 40, a power supply 38, sensors 36, 44, a processing system 22, a communication system 24, a body 20, and/or include any other suitable component.

The lift mechanism 40 of the aerial system functions to provide lift, and preferably includes a set of rotors driven (individually or collectively) by one or more motors. Each rotor is preferably configured to rotate about a corresponding rotor axis, define a corresponding rotor plane normal to its rotor axis, and sweep out a swept area on its rotor plane. The motors are preferably configured to provide sufficient power to the rotors to enable aerial system flight, and are more preferably operable in two or more modes, at least one of which includes providing sufficient power for flight and at least one of which includes providing less power than required for flight (e.g., providing zero power, providing 10% of a minimum flight power, etc.). The power provided by the motors preferably affects the angular velocities at which the rotors rotate about their rotor axes. During aerial system flight, the set of rotors are preferably configured to cooperatively or individually generate (e.g., by rotating about their rotor axes) substantially all (e.g., more than 99%, more than 95%, more than 90%, more than 75%) of the total aerodynamic force generated by the aerial system 12 (possibly excluding a drag force generated by the body 20 such as during flight at high airspeeds). Alternatively, or additionally, the aerial system 12 can include any other suitable flight components that function to generate forces for aerial system flight, such as jet engines, rocket engines, wings, solar sails, and/or any other suitable force-generating components.

In one variation, the aerial system 12 includes four rotors, each arranged at a corner of the aerial system body. The four rotors are preferably substantially evenly dispersed about the aerial system body, and each rotor plane is preferably substantially parallel (e.g., within 10 degrees) a lateral plane of the aerial system body (e.g., encompassing the longitudinal and lateral axes). The rotors preferably occupy a relatively large portion of the entire aerial system 12 (e.g., 90%, 80%, 75%, or majority of the aerial system footprint, or any other suitable proportion of the aerial system 12). For example, the sum of the square of the diameter of each rotor can be greater than a threshold amount (e.g., 10%, 50%, 75%, 90%, 110%, etc.) of the convex hull of the projection of the aerial system 12 onto a primary plane of the system (e.g., the lateral plane). However, the rotors can be otherwise arranged.

The power supply 38 of the aerial system functions to power the active components of the aerial system 12 (e.g., lift mechanism's motors, etc.). The power supply 38 can be mounted to the body 20 and connected to the active components, or be otherwise arranged. The power supply 38 can be a rechargeable battery, secondary battery, primary battery, fuel cell, or be any other suitable power supply.

The sensors 36, 44 of the aerial system function to acquire signals indicative of the aerial system's ambient environment and/or aerial system operation. The sensors 36, 44 are preferably mounted to the body 20, but can alternatively be mounted to any other suitable component. The sensors 36, 44 are preferably powered by the power supply 38 and controlled by the processor, but can be connected to and interact with any other suitable component. The sensors 36, 44 can include one or more: cameras (e.g., CCD, CMOS, multispectral, visual range, hyperspectral, stereoscopic, etc.), orientation sensors (e.g., inertial measurement sensors, accelerometer, gyroscope, altimeter, magnetometer, etc.), audio sensors (e.g., transducer, microphone, etc.), barometers, light sensors, temperature sensors, current sensor (e.g., Hall effect sensor), air flow meter, voltmeters, touch sensors (e.g., resistive, capacitive, etc.), proximity sensors, force sensors (e.g., strain gauge meter, load cell), vibration sensors, chemical sensors, sonar sensors, location sensor (e.g., GPS, GNSS, triangulation, etc.), or any other suitable sensor. In one variation, the aerial system 12 includes a first camera mounted (e.g., statically or rotatably) along a first end of the aerial system body with a field of view intersecting the lateral plane of the body; a second camera mounted along the bottom of the aerial system body with a field of view substantially parallel the lateral plane; and a set of orientation sensors, such as an altimeter and accelerometer. However, the system can include any suitable number of any sensor type.

The processing system 22 of the aerial system functions to control aerial system operation. The processing system 22 can perform the method; stabilize the aerial system 12 during flight (e.g., selectively operate the rotors to minimize aerial system wobble in-flight); receive, interpret, and operate the aerial system 12 based on remote control instructions; or otherwise control aerial system operation. The processing system 22 is preferably configured to receive and interpret measurements sampled by the sensors 36, 44, more preferably by combining measurements sampled by disparate sensors (e.g., combining camera and accelerometer data). The aerial system 12 can include one or more processing systems, wherein different processors can perform the same functionality (e.g., function as a multi-core system), or be specialized. The processing system 22 can include one or more: processors (e.g., CPU, GPU, microprocessor, etc.), memory (e.g., Flash, RAM, etc.), or any other suitable component. The processing system 22 is preferably mounted to the body 20, but can alternatively be mounted to any other suitable component. The processing system 22 is preferably powered by the power supply 38, but can be otherwise powered. The processing system 22 is preferably connected to and controls the sensors 36, 44, communication system 24, and lift mechanism 40, but can additionally or alternatively be connected to and interact with any other suitable component.

The communication system 24 of the aerial system functions to communicate with one or more remote computing systems. The communication system 24 can be a long-range communication module, a short-range communication module, or any other suitable communication module. The communication system 24 can facilitate wired and/or wireless communication. Examples of the communication system 24 include an 802.11x, Wi-Fi, Wi-Max, NFC, RFID, Bluetooth, Bluetooth Low Energy, ZigBee, cellular telecommunications (e.g., 2G, 3G, 4G, LTE, etc.), radio (RF), wired connection (e.g., USB), or any other suitable communication system 24 or combination thereof. The communication system 24 is preferably powered by the power supply 38, but can be otherwise powered. The communication system 24 is preferably connected to the processing system 22, but can additionally or alternatively be connected to and interact with any other suitable component.

The body 20 of the aerial system functions to support the aerial system components. The body can additionally function to protect the aerial system components. The body 20 preferably substantially encapsulates the communication system 24, power supply 38, and processing system 22, but can be otherwise configured. The body 20 can include a platform, a housing, or have any other suitable configuration. In one variation, the body 20 includes a main body housing the communication system 24, power supply 38, and processing system 22, and a first and second frame (e.g., cage) extending parallel the rotor rotational plane and arranged along a first and second side of the main body 20. The frames can function as an intermediary component between the rotating rotors and a retention mechanism (e.g., retention mechanism such as a user's hand). The frame can extend along a single side of the body 20 (e.g., along the bottom of the rotors, along the top of the rotors), along a first and second side of the body 20 (e.g., along the top and bottom of the rotors), encapsulate the rotors (e.g., extend along all sides of the rotors), or be otherwise configured. The frames can be statically mounted or actuatably mounted to the main body 20.

The frame can include one or more apertures (e.g., airflow apertures) fluidly connecting one or more of the rotors to an ambient environment, which can function to enable the flow of air and/or other suitable fluids between the ambient environment and the rotors (e.g., enabling the rotors to generate an aerodynamic force that causes the aerial system 12 to move throughout the ambient environment). The apertures can be elongated, or can have comparable length and width. The apertures can be substantially identical, or can differ from each other. The apertures are preferably small enough to prevent components of a retention mechanism (e.g., fingers of a hand) from passing through the apertures. The geometrical transparency (e.g., ratio of open area to total area) of the frame near the rotors is preferably large enough to enable aerial system flight, more preferably enabling high-performance flight maneuvering. For example, each aperture can be smaller than a threshold size (e.g., smaller than the threshold size in all dimensions, elongated slots narrower than but significantly longer than the threshold size, etc.). In a specific example, the frame has a geometrical transparency of 80-90%, and the apertures (e.g., circles, polygons such as regular hexagons, etc.) each of define a circumscribed circle with a diameter of 12-16 mm. However, the body can be otherwise configured.

The body 20 (and/or any other suitable aerial system components) can define a retention region that can be retained by a retention mechanism (e.g., a human hand, an aerial system dock, a claw, etc.). The retention region preferably surrounds a portion of one or more of the rotors, more preferably completely surrounding all of the rotors, thereby preventing any unintentional interaction between the rotors and a retention mechanism or other object near the aerial system 12. For example, a projection of the retention region onto an aerial system plane (e.g., lateral plane, rotor plane, etc.) can overlap (e.g., partially, completely, a majority of, at least 90% of, etc.) a projection of the swept area of one or more of the rotors (e.g., swept area of a rotor, total swept area of the set of rotors, etc.) onto the same aerial system plane.

The aerial system 12 can additionally include inputs (e.g., microphones, cameras, etc.), outputs (e.g., displays, speakers, light emitting elements, etc.), or any other suitable component.

In the illustrated embodiment, the remote computing system 14 functions to receive auxiliary user inputs, and can additionally function to automatically generate control instructions for and send the control instructions to the aerial system(s) 12. Each aerial system 12 can be controlled by one or more remote computing systems 14. The remote computing system 14 preferably controls the aerial system 12 through a client (e.g., a native application, browser application, etc.), but can otherwise control the aerial system 12. The remote computing system 14 can be a user device, remote server system, connected appliance, or be any other suitable system. Examples of the user device include a tablet, smartphone, mobile phone, laptop, watch, wearable device (e.g., glasses), or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a Wi-Fi module, BLE, cellular module, etc.), or any other suitable component.

The system 10 may be configured for controller-free user drone interaction. Normally, the aerial system, or drone, 12 requires a separate device, e.g., the remote device 14. The remote device 14 may be embodied in different types of devices, including, but not limited to a ground station, remote control, or mobile phone, etc. . . . In some embodiments, control of the aerial system 12 may be accomplished by the user through user expression without utilization of the remote device 14. User expression may include, but is not limited to, any action performed by the user that do not include physical interaction with the remote device 14, including thought (through brain wave measurement), facial expression (including eye movement), gesture and/or voice. In such embodiments, user instructions are received directly via the optical sensors 36 and at least some of the other sensors 44 and processed by the onboard processing system 22 to control the aerial system 12.

In some embodiments, the aerial system 12 may alternatively be controlled via the remote device 14.

In at least one embodiment, the aerial system 12 may be controlled without physical interaction with the remote device 14, however, a display of the remote device 14 may be used to display images and/or video relayed from the aerial system 12 which may aid the user 18 in controlling the aerial system 12. In addition, sensors 36, 44 associated with the remote device 14, e.g., camera(s) and/or a microphone (not show) may relay data to the aerial system 12, e.g., when the aerial system 12 is too far away from the user 18. The sensor data relayed from the remote device 14 to the aerial system 12 is used in the same manner as the sensor data from the on-board sensors 36, 44 are used to control the aerial system 12 using user expression.

In this manner, the aerial system 12 may be fully controlled, from start to finish, either (1) without utilization of a remote device 14, or (2) without physical interaction with the remote device 14. Control of the aerial system 12 based on user instructions received at various on-board sensors 36, 44. It should be noted that in the following discussion, utilization of on-board sensors 36, 44 may also include utilization of corresponding or similar sensors on the remote device 14.

In general, the user 18 may utilize certain gestures and/or voice control to control take-off, landing, motion of the aerial system 12 during flight and other features, such as triggering of photo and/or video capturing. As discussed above, the aerial system 12 may provide the following features without utilization of, or processing by, a remote device 14:

Take-off and landing;
Owner recognition;
Facial recognition;
Speech recognition;
Facial expression and gesture recognition; and,
Control, e.g., motion, of the aerial system based on owner, facial, expression and gesture recognition, and speech recognition.

As detailed above, the aerial system 12 includes an optical system 26 that includes one or more optical sensor 36, such as a camera. The at least one on-board camera is configured for live video streaming and computer vision analysis. Optionally the aerial system 12 can have at least one depth sensor (or stereo-vision pair) for multi-pixel depth sensing. Optionally the aerial system 12 can have at least one microphone on board for voice recognition and control.

In general, in order to provide full control of the aerial system 12, a plurality of user/drone interactions or activities from start to end of an aerial session are provided. The user/drone interactions, include, but are not limited to take-off and landing, owner recognition gesture recognition, facial expression recognition, and voice control.

With reference to FIG. 5 and FIG. 6, in another aspect of the present invention, the aerial system 12 may include an obstacle detection and avoidance system 50. In one embodiment, the obstacle detection and avoidance system 50 includes the pair of ultra-wide angle lens cameras 52A 52B. As will be described more fully below, in one embodiment, the pair of cameras 52A, 52B, are equipped coaxially at the center top and bottom of the drone fuselage 20, respectively.

The method and/or system can confer several benefits over conventional systems. First, the images recorded by the camera are processed on-board, in real- or near-real time. This allows the robot to navigate using the images recorded by the cameras.

The pair of cameras 52A, 52B are generally mounted or statically fixed to housing of the body 20. A memory 54 and a vision processing system 56 are connected to the pair of cameras 52A, 52B. The vision processing system 56 includes a processor programed to perform functions to sample images of a monitored region for real- or near-real time image processing, such as depth analysis. The vision processing system 56 can additionally or alternatively generate 3D video, generate a map of the monitored region, or perform any other suitable functionality.

The housing of the fuselage body 20 functions to retain the pair of cameras 52A, 52B in a predetermined configuration. The system preferably includes a single housing that retains the pair of cameras 52A, 52B, but can alternatively include multiple housing pieces or any other suitable number of housing pieces.

The pair of cameras 52A, 52B may function to sample signals of the ambient environment surrounding the system 12. The pair of cameras 52A, 52B are arranged with the respective view cone of each camera overlapping a view cone 110 of the other camera.

Each camera 52A, 52B can be a CCD camera, CMOS camera, or any other suitable type of camera. The camera can be sensitive in the visible light spectrum, IR spectrum, or any other suitable spectrum. The camera can be hyperspectral, multispectral, or capture any suitable subset of bands. The cameras can have a fixed focal length, adjustable focal length, or any other suitable focal length. However, the camera can have any other suitable set of parameter values. The cameras of the plurality can be identical or different.

Each camera is preferably associated with a known location relative to a reference point (e.g., on the housing, a camera of the plurality, on the host robot, etc.), but can be associated with an estimated, calculated, or unknown location. The pair of cameras 52A, 52B are preferably statically mounted to the housing (e.g., through-holes in the housing), but can alternatively be actuatably mounted to the housing (e.g., by a joint). The cameras can be mounted to the housing faces, edges, vertices, or to any other suitable housing feature. The cameras can be aligned with, centered along, or otherwise arranged relative to the housing feature. The camera can be arranged with an active surface perpendicular a housing radius or surface tangent, an active surface parallel a housing face, or be otherwise arranged. Adjacent camera active surfaces can be parallel each other, at a non-zero angle to each other, lie on the same plane, be angled relative to a reference plane, or otherwise arranged. Adjacent cameras preferably have a baseline distance (e.g., inter-camera or axial distance, distance between the respective lenses, etc.) of 6.35 cm, but can be further apart or closer together.

The cameras 52A, 52B may be connected to the same visual processing system 56 and memory 54, but can be connected to disparate visual processing systems and/or memories. The cameras are preferably sampled on the same clock, but can be connected to different clocks (e.g., wherein the clocks can be synchronized or otherwise related). The cameras are preferably controlled by the same processing system, but can be controlled by different processing systems. The cameras are preferably powered by the same power source (e.g., rechargeable battery, solar panel array, etc.; host robot power source, separate power source, etc.), but can be powered by different power sources or otherwise powered.

The obstacle detection and avoidance system 50 may also include an emitter 58 that functions to illuminate a physical region monitored by the cameras 52A, 52B. The system 50 can include one emitter 58 for one or more of the cameras 52A, 52B, multiple emitters 58 for one or more of the cameras 52A, 52B, emitters 58, or any suitable number of emitters 58 in any other suitable configuration. The emitter (s) 58 may be mounted to the body 20 and configured to emit modulated light, structured light (e.g., having a known pattern), collimated light, diffuse light, or light having any other suitable property. The emitted light can include wavelengths in the visible range, UV range, IR range, or in any other suitable range. The emitter position (e.g., relative to a given camera) is preferably known, but can alternatively be estimated, calculated, or otherwise determined.

In a second variation, the obstacle detection and avoidance system 50 operates as a non-contact active 3D scanner. The non-contact system is a time of flight sensor, including a camera and an emitter, wherein the camera records reflections (of the signal emitted by the emitter) off obstacles in the monitored region and determines the distance between the system 50 and the obstacle based on the reflected signal. The camera and emitter are preferably mounted within a predetermined distance of each other (e.g., several mm), but can be otherwise mounted. The emitted light can be diffuse, structured, modulated, or have any other suitable parameter. In a second variation, the non-contact system is a triangulation system, also including a camera and emitter. The emitter is preferably mounted beyond a threshold distance of the camera (e.g., beyond several mm of the camera) and directed at a non-parallel angle to the camera active surface (e.g., mounted to a vertex of the housing), but can be otherwise mounted. The emitted light can be collimated, modulated, or have any other suitable parameter. However, the system 50 can define any other suitable non-contact active system. However, the pair of cameras can form any other suitable optical range finding system.

The memory 54 of the system 50 functions to store camera measurements. The memory can additionally function to store settings; maps (e.g., calibration maps, pixel maps); camera positions or indices; emitter positions or indices; or any other suitable set of information. The system can include one or more pieces of memory. The memory is preferably nonvolatile (e.g., flash, SSD, eMMC, etc.), but can alternatively be volatile (e.g. RAM). In one variation, the cameras 52A, 52B write to the same buffer, wherein each camera is assigned a different portion of the buffer. In a second variation, the cameras 52A, 52B write to different buffers in the same or different memory. However, the cameras 52A, 52B can write to any other suitable memory. The memory 54 is preferably accessible by all processing systems of the system (e.g., vision processor, application processor), but can alternatively be accessible by a subset of the processing systems (e.g., a single vision processor, etc.).

The vision processing system 56 of the system 50 functions to determine the distance of a physical point from the aerial system 12. The vision processing system 56 preferably determines the pixel depth of each pixel from a subset of pixels, but can additionally or alternatively determine the object depth or determine any other suitable parameter of a physical point or collection thereof (e.g., object). The vision processing system 56 preferably processes the sensor stream from the cameras 52A, 52B.

The vision processing system 56 may process each sensor stream at a predetermined frequency (e.g., 30 FPS), but can process the sensor streams at a variable frequency or at any other suitable frequency. The predetermined frequency can be received from an application processing system 60, retrieved from storage, automatically determined based on a camera score or classification (e.g., front, side, back, etc.), determined based on the available computing resources (e.g., cores available, battery level remaining, etc.), or otherwise determined. In one variation, the vision processing system 56 processes multiple sensor streams at the same frequency. In a second variation, the vision processing system 56 processes multiple sensor streams at different frequencies, wherein the frequencies are determined based on the classification assigned to each sensor stream (and/or source camera), wherein the classification is assigned based on the source camera orientation relative to the host robot's travel vector.

The application processing system 60 of the system 50 functions to determine the time multiplexing parameters for the sensor streams. The application processing system 60 can additionally or alternatively perform object detection, classification, tracking (e.g., optical flow), or any other suitable process using the sensor streams. The application processing system can additionally or alternatively generate control instructions based on the sensor streams (e.g., based on the vision processor output). For example, navigation (e.g., using SLAM, RRT, etc.) or visual odometry processes can be performed using the sensor streams, wherein the system and/or host robot is controlled based on the navigation outputs.

The application processing system 60 can additionally or alternatively receive control commands and operate the aerial system 12 and/or host robot based on the commands. The application processing system 60 can additionally or alternatively receive external sensor information and selectively operate the aerial system 12 and/or host robot based on the commands. The application processing system 60 can additionally or alternatively determine robotic system kinematics (e.g., position, direction, velocity, and acceleration) based on sensor measurements (e.g., using sensor fusion). In one example, the application processing system 60 can use measurements from an accelerometer and gyroscope to determine the traversal vector of the system and/or host robot (e.g., system direction of travel). The application processing system 60 can optionally automatically generate control instructions based on the robotic system kinematics. For example, the application processing system 60 can determine the location of the system (in a physical volume) based on images from the cameras 52A, 52B, wherein the relative position (from the orientation sensors) and actual position and speed (determined from the images) can be fed into the flight control module. In this example, images from a downward-facing camera subset can be used to determine system translation (e.g., using optical flow), wherein the system translation can be further fed into the flight control module. In a specific example, the flight control module can synthesize these signals to maintain the robot position (e.g., hover a drone).

The application processing system 60 can include one or more application processors. The application processor can be a CPU, GPU, microprocessor, or any other suitable processing system. The application processing system 60 can implemented as part of, or separate from, the vision processing system 56, or be different from the vision processing system 56. The application processing system 60 may be connected to the visual processing system 56 by one or more interface bridges. The interface bridge can be a high-throughput and/or bandwidth connection, and can use a MIPI protocol (e.g., 2-input to 1-output camera aggregator bridges—expands number of cameras that can be connected to a vision processor), a LVDS protocol, a DisplayPort protocol, an HDMI protocol, or any other suitable protocol. Alternatively, or additionally, the interface bridge can be a low-throughout and/or bandwidth connection, and can use a SPI protocol, UART protocol, I2C protocol, SDIO protocol, or any other suitable protocol.

In one embodiment, the obstacle detection and avoidance system 50 may optionally include an image signal processing unit (ISP) 62 that functions to pre-process the camera signals (e.g., images) before passing to vision processing system and/or application processing system. The ISP 62 can process the signals from all cameras, the signals from the camera subset, or signals any other suitable source. The ISP 62 can auto-white balance, correct field shading, rectify lens distortion (e.g., dewarp), crop, select a pixel subset, apply a Bayer transformation, demosaic, apply noise reduction, sharpen the image, or otherwise process the camera signals. For example, the ISP 62 can select the pixels associated with an overlapping physical region between two cameras from images of the respective streams (e.g., crop each image to only include pixels associated with the overlapping region shared between the cameras of a stereo-camera pair). The ISP 62 can be a system on a chip with multi-core processor architecture, be an ASIC, have ARM architecture, be part of the vision processing system, be part of the application processing system, or be any other suitable processing system.

The obstacle detection and avoidance system 50 may optionally include sensors 64 that function to sample signals indicative of system operation. The sensor output can be used to determine system kinematics, process the images (e.g., used in image stabilization), or otherwise used. The sensors 64 can be peripheral devices of the vision processing system 56, the application processing system 60, or of any other suitable processing system. The sensors 64 are preferably statically mounted to the housing but can alternatively be mounted to the host robot or to any other suitable system. Sensors 64 can include: orientation sensors (e.g., IMU, gyroscope, accelerometer, altimeter, magnetometer), acoustic sensors (e.g., microphones, transducers), optical sensors (e.g., cameras, ambient light sensors), touch sensors (e.g., force sensors, capacitive touch sensor, resistive touch sensor), location sensors (e.g., GPS system, beacon system, trilateration system), or any other suitable set of sensors.

The obstacle detection and avoidance system 50 can optionally include inputs (e.g., a keyboard, touchscreen, microphone, etc.), outputs (e.g., speakers, lights, screen, vibration mechanism, etc.), communication system (e.g., a WiFi module, BLE, cellular module, etc.), power storage (e.g., a battery), or any other suitable component.

The obstacle detection and avoidance system 50 is preferably used with a host robot that functions to traverse within a physical space. The host robot can additionally or alternatively receive remote control instructions and operate according to the remote control instructions. The host robot can additionally generate remote content or perform any other suitable functionality. The host robot can include one or more: communication modules, motive mechanisms, sensors, content-generation mechanisms, processing systems, reset mechanisms, or any other suitable set of components. The host robot can be a drone, vehicle, robot, security camera, or be any other suitable remote-controllable system. The motive mechanism can include a drivetrain, rotors, jets, treads, rotary joint, or any other suitable motive mechanism. The application processing system is preferably the host robot processing system, but can alternatively be connected to the host robot processing system or be otherwise related. In a specific example, the host robot includes an aerial system (e.g., drone) with a WiFi module, a camera, and the application processing system. The system can be mounted to the top of the host robot (e.g., as determined based on a gravity vector during typical operation), the bottom of the host robot, the front of the host robot, centered within the host robot, or otherwise mounted to the host robot. The system can be integrally formed with the host robot, removably coupled to the host robot, or otherwise attached to the host robot. One or more systems can be used with one or more host robots.

With reference to FIGS. 7-17, an aerial system 12 including an obstacle detection and avoidance system 50 is shown. The obstacle detection and avoidance system 50 is configured to achieve omnidirectional depth sensing and obstacle avoidance on the aerial system 12.

Figure 7:
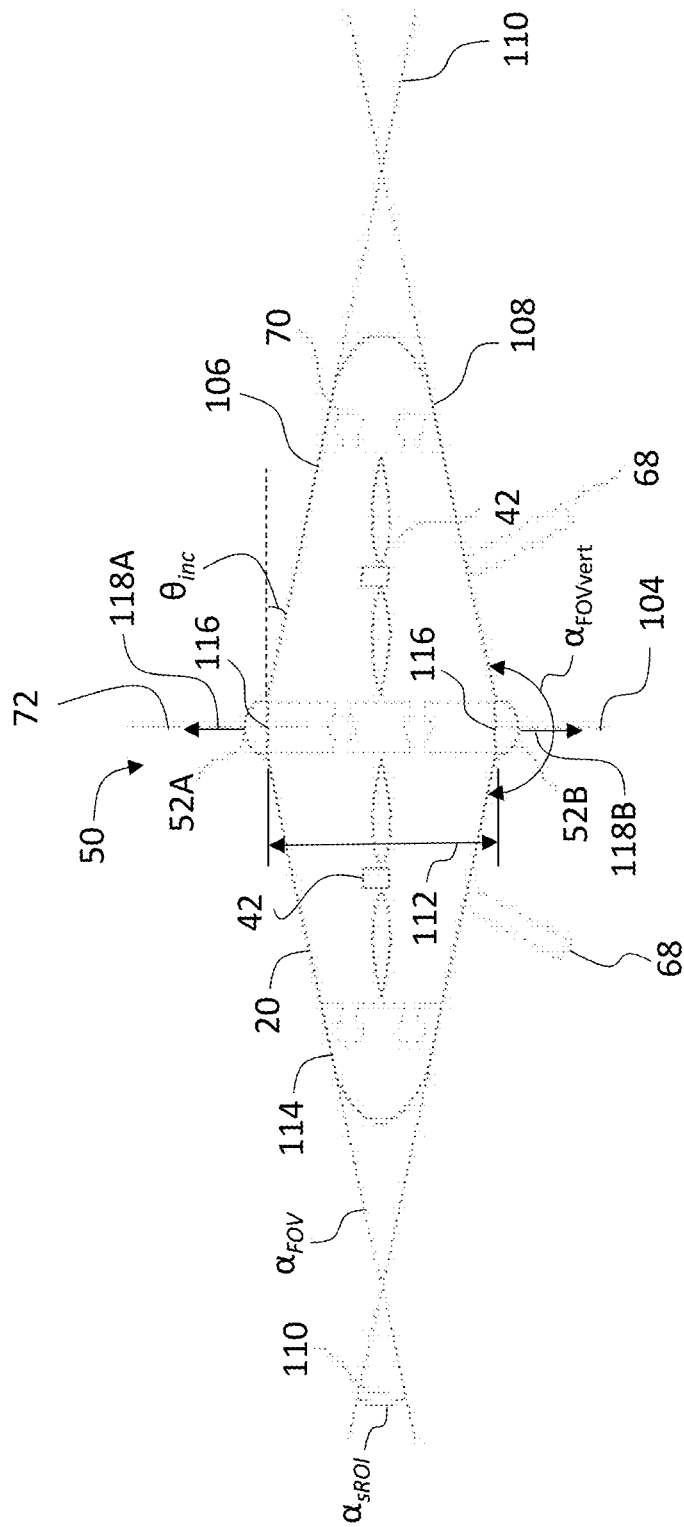
FIG. 7 is a side view of a diagrammatic illustration of the aerial system of FIG. 6, according to an embodiment of the present invention.

A first embodiment of the aerial system 12 with an obstacle detection and avoidance system 50 is shown in FIG. 7-12. With reference to FIG. 7, the obstacle detection and avoidance system 12 includes a pair of ultra-wide angle lens cameras 52A, 52B are equipped coaxially along an optical axis 72 at the center top and center bottom of the fuselage body 20, respectively, and spaced a predefined baseline distance 112 (e.g., inter-camera or axial distance, distance between the respective lenses, etc.) measured along the optical axis 72.

The field-of-view (FOV) of each camera 52A, 52B is required to be greater than 180 degrees, and the drone fuselage body 20 includes an outer surface 114 including a profile having an inclination angle, $\theta_{inc}$, that satisfies:

$$\theta_{inc} > (\alpha_{FOV} - 180)/2.$$

Figure 10:
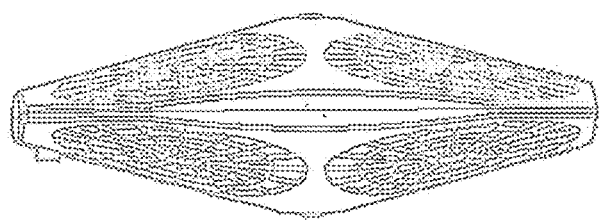
FIG. 10 is a side isometric view of the aerial system of FIG. 7.
Figure 11:
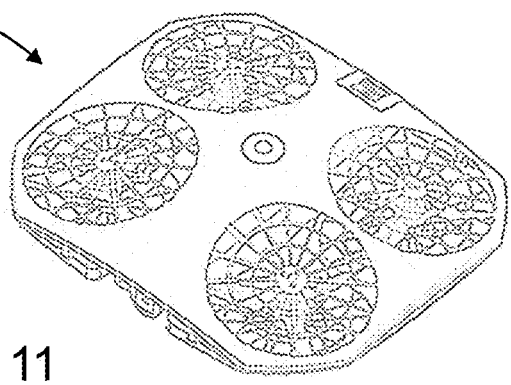
FIG. 11 is an upper isometric view of the aerial system of FIG. 7.
Figure 12:
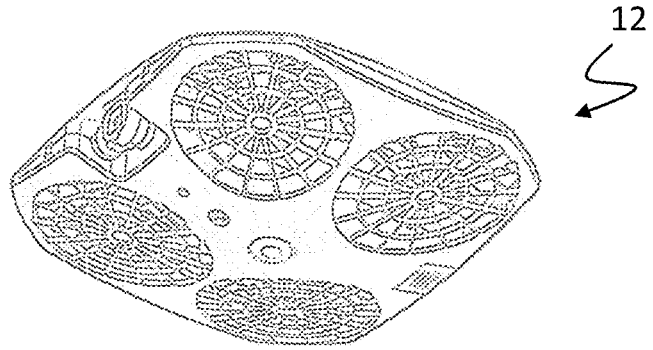
FIG. 12 is a lower isometric view of the aerial system of FIG. 7.

The drone fuselage profile can be seen more clearly in the side, upper isometric and lower isometric views shown in FIGS. 10, 11 and 12, respectively.

In this way, a viewable region of interest 110 including an overlapping vertical field angle, $\alpha_{sROI}$, is generated for obtaining a pair of omnistereo images surrounding the body (or drone fuselage) 20 for further depth sensing.

Figure 8:
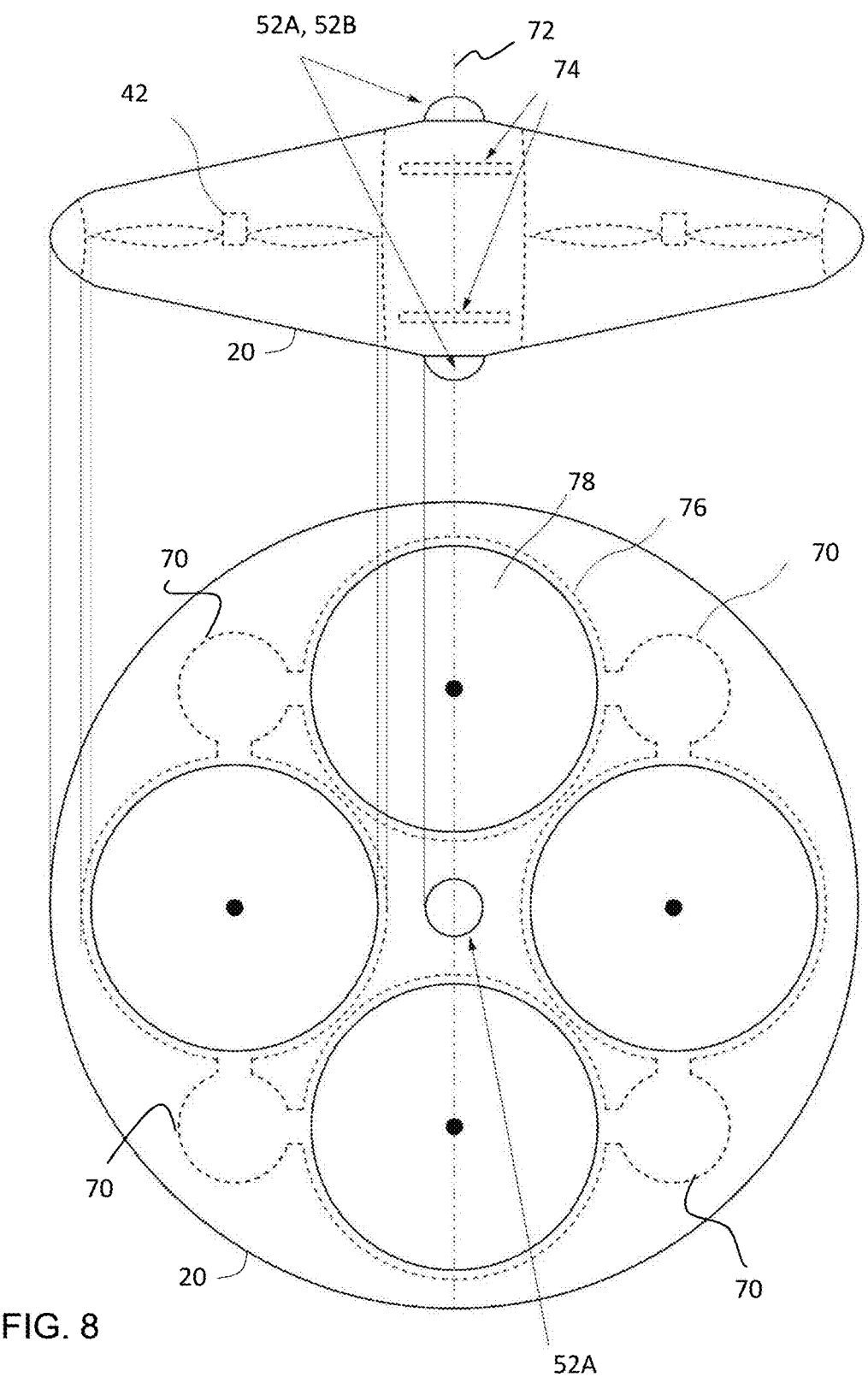
FIG. 8 is a second side view and a top view of the aerial system of FIG. 7.

The design may also incorporate additional sensors such as proximity sensor 84, sonar, TOF-based distance sensor, etc. to assist obstacle avoidance, as shown in FIG. 8.

With reference to FIG. 7, in the illustrated embodiment, the obstacle detection system 50 includes a pair of ultra-wide angle lens cameras 52A, 52B that are each coupled to the fuselage body 20. Each ultra-wide angle lens camera 52A, 52B includes a field-of-view lens having a vertical angle of view $\alpha_{FOVvert}$ greater than 180 degrees. In addition, in one embodiment, one or more of the ultra-wide angle lens camera 52A, 52B includes a field-of-view lens having a 360 degree horizontal angle of view $\alpha_{FOVhorz}$ (shown in FIG. 15). In the illustrated embodiment, the pair of ultra-wide angle lens cameras 52A, 52B are orientated such that a portion of each corresponding camera field-of-view overlaps to define a viewable region of interest 110 including overlapping vertical field angle $\alpha_{sROI}$. In addition, each ultra-wide angle lens camera 52A, 52B includes an optical center point 116 that orientated coaxially along the optical axis 72.

In the illustrated embodiment, the pair of ultra-wide angle lens cameras includes the first ultra-wide angle lens cameras 52A coupled to the top portion 106 of the fuselage body 20 and the second ultra-wide angle lens cameras 52B coupled to the opposite bottom portion 108 of the fuselage body 20.

Each ultra-wide angle lens camera 52A, 52B includes a field-of-view orientated in a viewing direction, represented by arrow 118 shown in FIG. 7. In one embodiment, each of the first and the second ultra-wide angle lens cameras 52A, 52B has a viewing direction 118 orientated away from the fuselage body 20. For example, as shown in FIG. 7, the first ultra-wide angle lens camera 52A is positioned such that the viewing direction 118A of the first ultra-wide angle lens camera 52A is orientated away from the fuselage body 20, and the second ultra-wide angle lens camera 52B is positioned such that the viewing direction 118B of the second ultra-wide angle lens camera 52B is orientated opposite the viewing direction 118A of the first ultra-wide angle lens camera 52A and away from the fuselage body 20.

In one aspect of the present invention, the fuselage body 20 includes a disk profile of the drone also allows implementation of cavity design for noise reduction. In one embodiment of the present invention, Helmholtz cavities 70 may be used. As shown in FIGS. 7 and 8, each motor and propeller assembly 42 may sit in an air duct 76 while connecting to one or more Helmholtz cavities 70.

Helmholtz resonators refers to an acoustic device consisting of a hollow neck attached to an empty volume, the purpose of which is to offer sound attenuation at a narrow band frequency close to its resonance frequency. The behavior at the air within the Helmholtz resonator is comparable to a driven, damped spring-mass system. Whenever a sinusoidal force acts on air in the resonator, the air in the neck will be comparable to a mass on a spring. The air in the cavity serves as the spring and provides the system's stiffness element. Due to its contact with the neck's wall, the mass of air in the neck will experience thermo-viscous losses, and this friction makes a part of the acoustic energy be converted into heat.

The Helmholtz resonator functions when its natural frequency is in proximity to the frequency of the tonal noise. The resonator's natural frequency is determined by its dimensions and the speed of the sound and is given by the equation:

$$v_0 = \frac{c}{2\pi} \sqrt{\frac{S_n}{L'V}}$$

In this equation, $v_0$ is natural frequency of the resonator, c is the speed of the sound in air, $S_n$ is the cross-sectional area of the neck, L' is the effective length from the neck, and V is the volume of the cavity.

Figure 9:
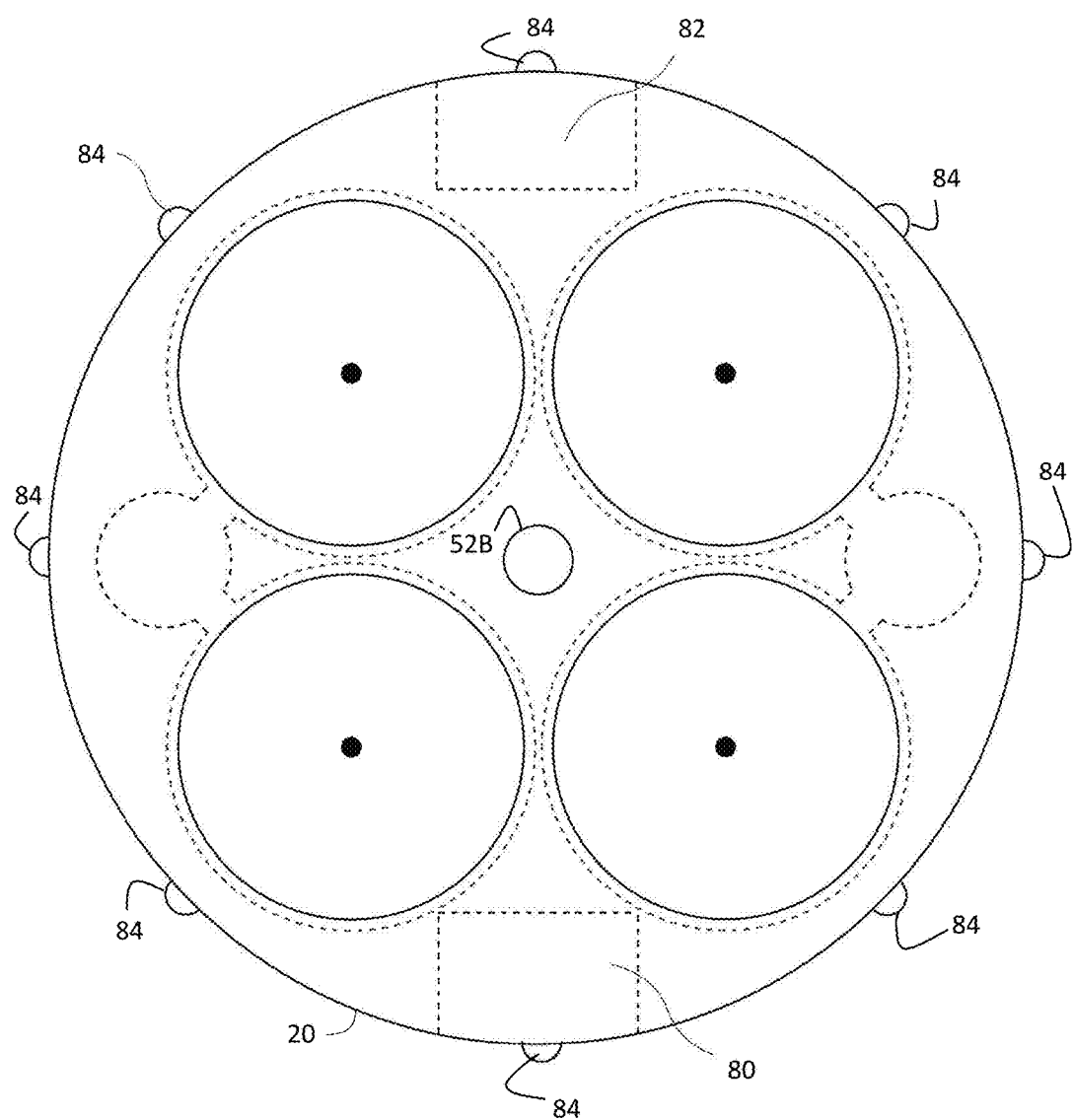
FIG. 9 is a bottom view of the aerial system of FIG. 7.

One or more of the Helmholtz cavities 70 may can be replaced by other sub-assembly modules such as gimbal/camera system 82, area for batteries 80 and other electronic components, as shown in FIG. 9.

Some of the Helmholtz cavities can be replaced by space for Helium balloons for extra buoyancy in the air, so that the motor/propeller pair 42 can spin more slowly, also contributing to noise reduction.

Figure 13:
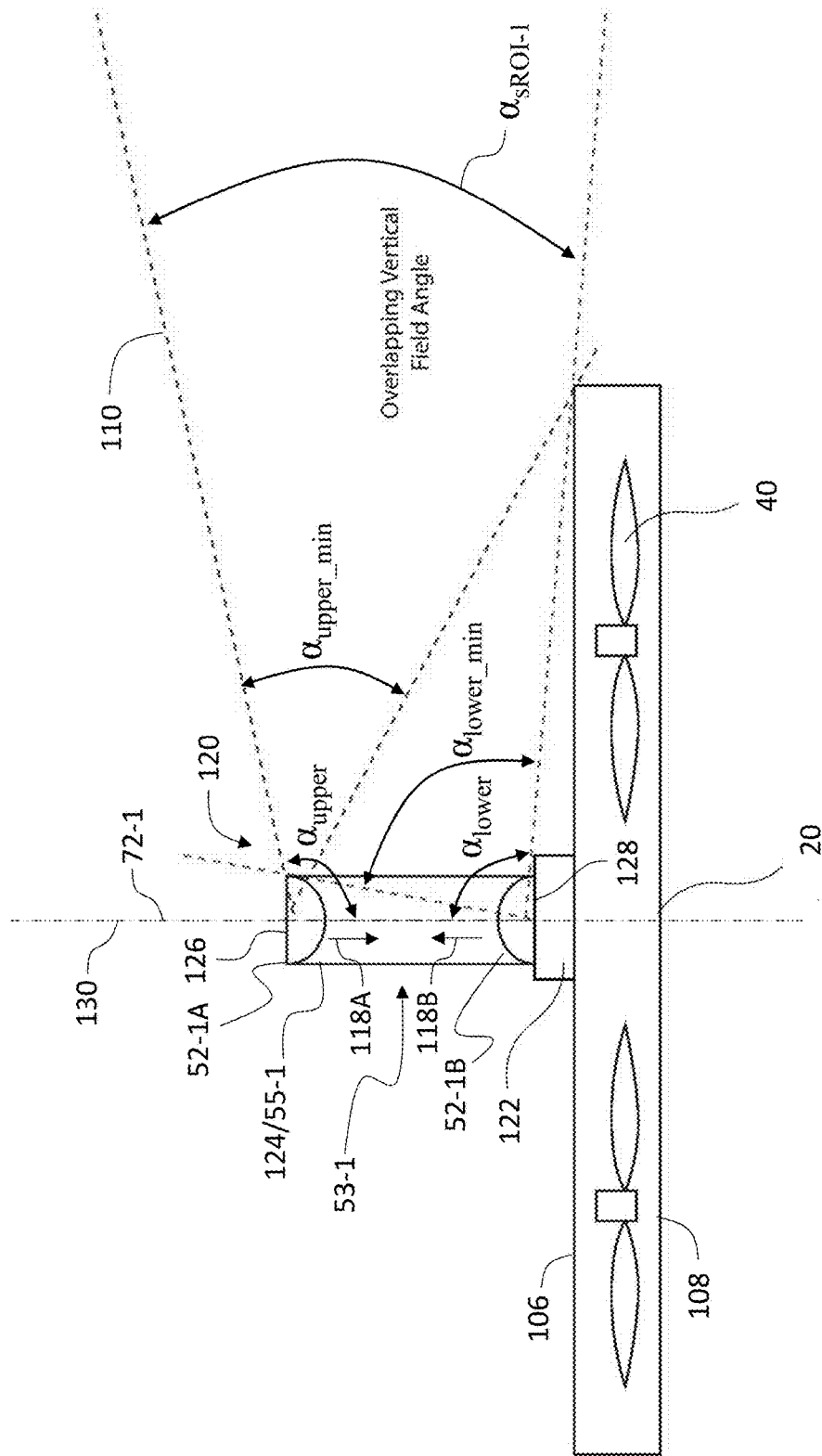
FIG. 13 a diagrammatic illustration of an aerial system including an obstacle detection and avoidance system, according to a second embodiment of the present invention.

A second embodiment of the aerial system 12 with an obstacle detection and avoidance system 50 is shown in FIGS. 13-17. With reference to FIG. 13, the obstacle detection and avoidance system 50 includes a pair of ultra-wide angle lens cameras 52-1A, 52-1B, and a support assembly 120 that is coupled to each of the ultra-wide angle lens cameras 52-1A, 52-1B to support the pair of ultra-wide angle lens cameras 52-1A, 52-1B from the fuselage body 20. In the illustrated embodiment, the support assembly 120 includes a support module 53-1 that includes support base 122 that is coupled to the fuselage body 20 and a support body 124 coupled to the support base 122 and extending outwardly from the outer surface 114 of the fuselage body 20 and between a first upper end 126 and a second lower end 128 along a centerline axis 130. The pair of ultra-wide angle lens cameras 52-1A, 52-1B are mounted in the support module 53-1 and are equipped coaxially at the center top and bottom of the module 53-1 (about axis 72-1), respectively. For example, as shown in FIG. 13, the first and the second ultra-wide angle lens cameras 52-1A, 52-1B are orientated along the centerline axis 130, with the second ultra-wide angle lens cameras 52-1B being positioned between the first ultra-wide angle lens cameras 52-1A and the fuselage body 20. In one embodiment, the viewing direction 118A of the first ultra-wide angle lens camera 52-1A is orientated towards the viewing direction 118B of the second ultra-wide angle lens cameras 52-1B. In addition, the viewing direction 118A of the first ultra-wide angle lens camera 52-1A is orientated towards the fuselage body 20 and the viewing direction 118B of the second ultra-wide angle lens cameras 52-1B is orientated award from the fuselage body 20. As shown in FIG. 13, the first upper camera 52-1A is directed towards the second lower camera 52-1B and the second lower camera 52-1B is directed towards the first upper camera 52-1A.

The FOV of each camera 52A, 52B is required to be greater than 180 degrees. In the illustrated embodiment, the obstacle detection and avoidance system 50 provides a generally 360-degree view around the drone fuselage 20.

Figure 14:
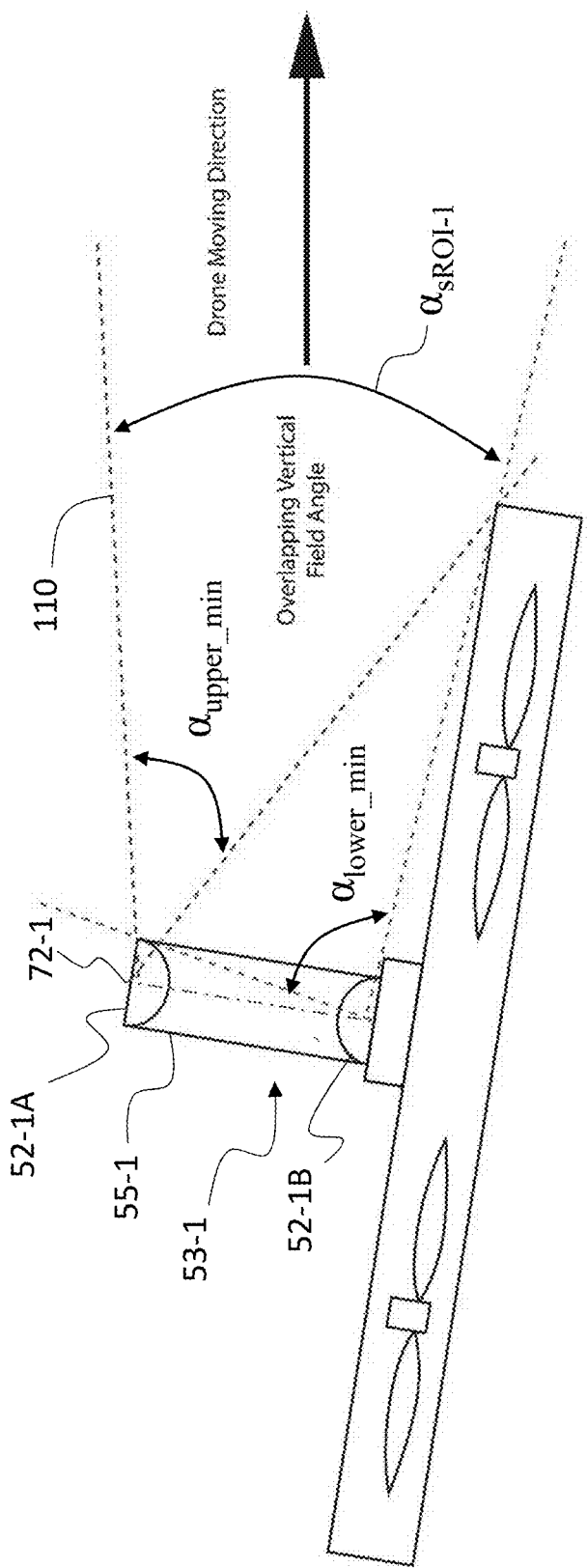
FIG. 14 is a second diagrammatic illustration of the aerial system of FIG. 13.

As shown in FIGS. 13 and 14, in any given direction, e.g., the direction of travel of the aerial system 12, the first upper camera 52-1A has a FOV (as measured from the optical axis 72-1) of $\alpha_{upper}$ and the second lower camera 52-1B has a FOV (as measured from the axis 72-1) of $\alpha_{lower}$. Each of the cameras 52-1A, 52-1B has a usable FOV (based on obstructions) of $\alpha_{upper\_min}$ and $\alpha_{lower\_min}$, respectively. As shown, the FOV of the upper and lower cameras 52-1A, 52-1B overlap, forming an overlapping vertical field angle, $\alpha_{sROI-1}$, is generated for obtaining a pair of omni-stereo images surrounding the body (or drone fuselage) 20 for further depth sensing.

Figure 16:
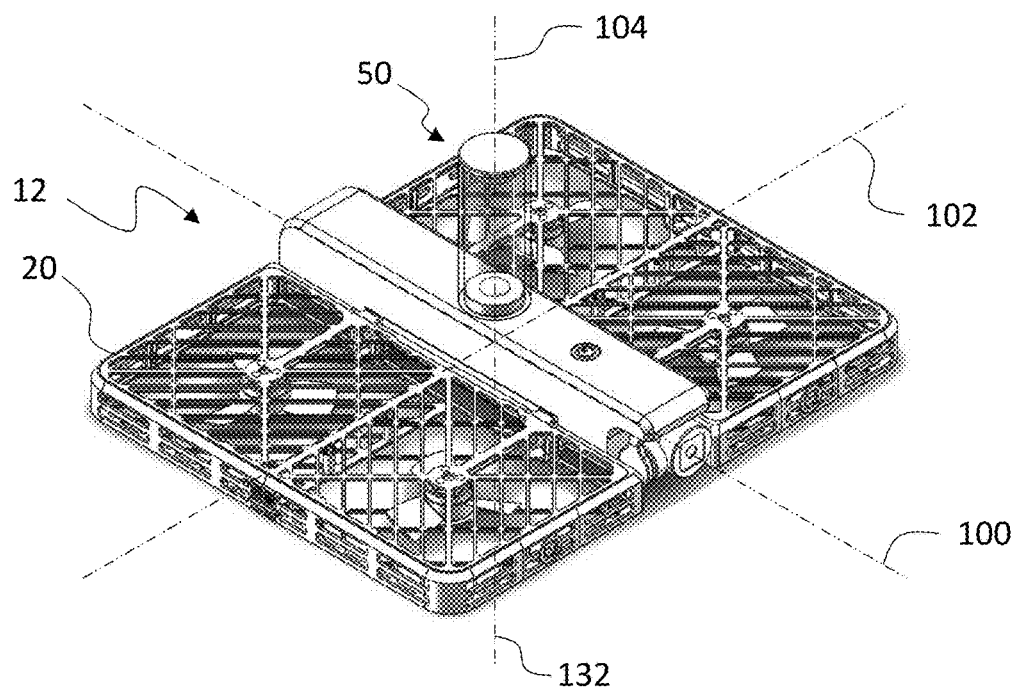
FIG. 16 is an upper isometric view of the aerial system of FIG. 13.
Figure 17:
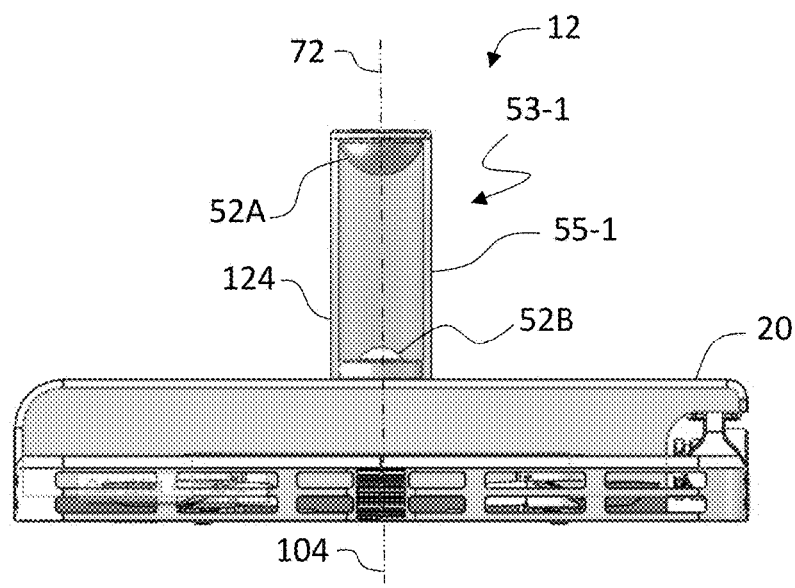
FIG. 17 is a side view isometric view of the aerial system of FIG. 13.

The drone fuselage profile in the second embodiment can be seen more clearly in the upper isometric and side views shown in FIGS. 16 and 17, respectively. In the second embodiment, the drone body 20 may take a more (generally) regular box shaped form (as shown). The support module 53-1 may include support body 124 having a cylindrical transparent lens/shield 55-1 with the first upper camera 52-1A mount at one end and the second lower camera 52-1B mounted at the other end. As shown in FIG. 15, the support module 53-1 may also include all necessary mechanical components, electronic printed circuit boards (and mounted components), cables, connectors, and any additional optical components. The module 53-1 may be detachably or fixedly mounted to either an upper surface or a lower surface of the body 20.

In the illustrated embodiment, the module 53-1 is centrally, detachably mounted to the top surface 106 of the body 20. Since the module 53-1 is located at the center of the body 20, the center of the mass remains centered along a central axis 132 (shown in FIGS. 16-17) of the body 20 (which coincides with axis 72-1). Furthermore, the overlapping vertical field angle at each horizontal azimuth angle is most evenly distributed along the perimeter of the body 20. If the support module 53-1 was not centralized along the (upper) surface, the vertical field angle along one side of the drone would be compromised.

As shown in FIG. 14, as the aerial system 12 moves in one direction, the body 20 tilts forward in that direction. If the support module 53-1 is located at the top center (as shown, the overlapping vertical field is least blocked by the body or fuselage 20 in the direction of motion. This is the area of most concern for obstacle detection and avoidance.

The selection of ultra-wide angle lens design is preferably to be stereographic or equidistant so that the marginal regions of the FOV (which is the most important in this scenario) are not compressed too much. Pixels within the overlapping stereo region of interest (SROI) from the two cameras can be first rectified into a pair of panoramic images from its original warped omnidirectional images. Preferably the two cameras 52-1A, 52-1B should have the same pixel size, pixel number, and lens design (intrinsic parameters). After rectification, pixel correspondence methods can be used to obtain depth information via triangulation. Techniques for image point matching are generally divided between dense (area-based scanning) and sparse (feature description) approaches. With a sparse feature points/dense point cloud with depth information, path and trajectory planning algorithms (such as rapidly-exploring random tree—RRT, A*, etc.) can be applied to generate the desired path of the drone to avoid obstacles.

The distance 112 between two ultra-wide angle cameras directly relates to the depth sensing precision. The following relationship holds:

$$\Delta D = \frac{D^2}{B}\tan(\Delta\varphi)$$

where ΔD is the distance error, D is the measured distance, B is the baseline (distance between two cameras), Δφ is the angle of view per pixel. Typically, it is necessary to keep a distance of 5-6 cm between the effective foci of the two cameras (assuming the camera satisfies a single effective view point—SVP model) in order to make the depth sensing applicable for obstacle sensing and avoidance.

Figure 18A:
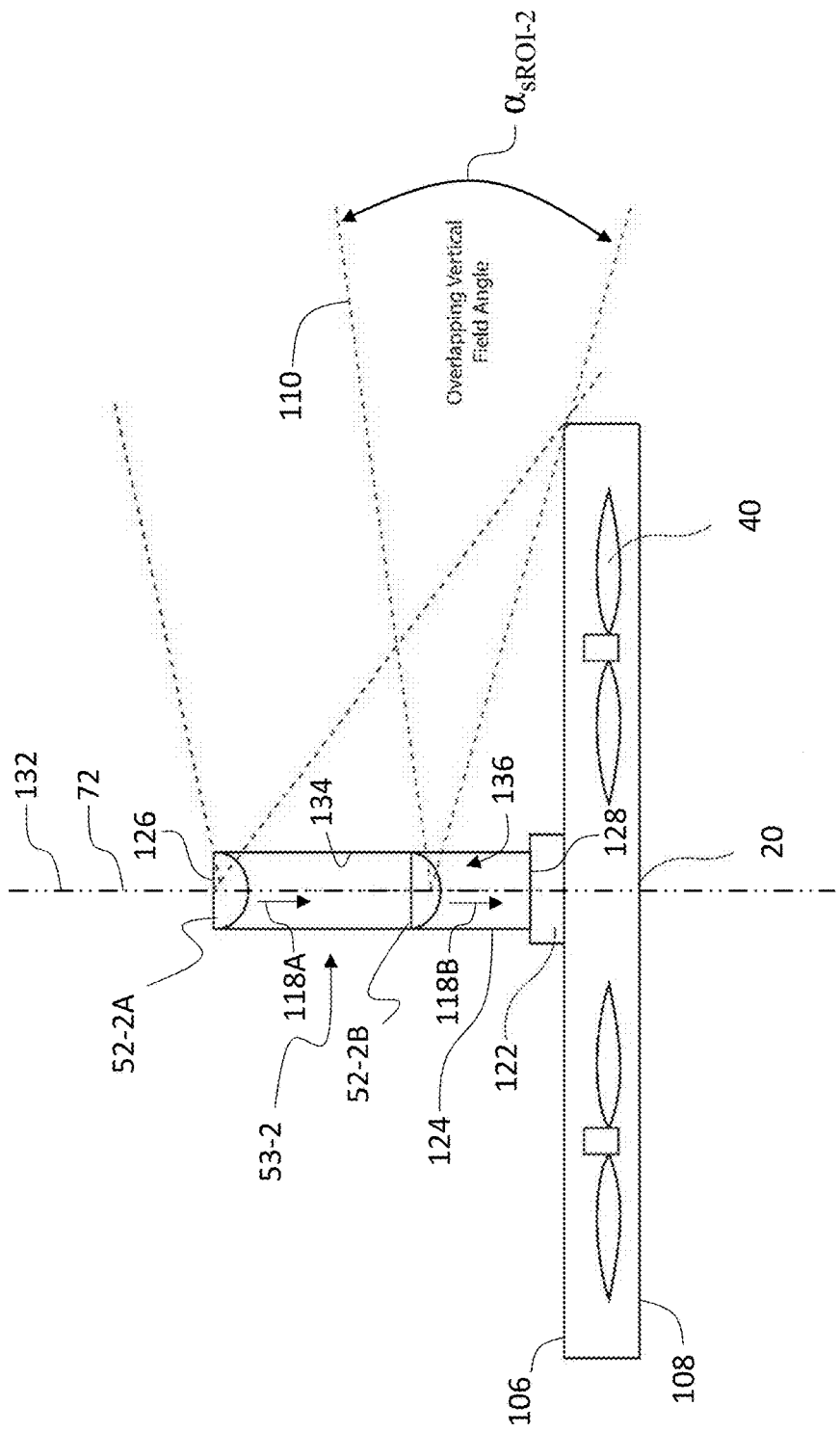
FIG. 18A is a diagrammatic illustration of an aerial system including an obstacle detection and avoidance system, according to a first alternative embodiment of the present invention.

With reference to FIG. 18A, a first alternative embodiment of the support module 53-2 is shown. In this embodiment, the support module 53-2 includes a support body 124 that includes an inner surface 134 that defines a support body cavity 136 extending between the first upper end 126 and the second lower end 128. The pair of ultra-wide angle lens cameras 52-2A, 52-2B are positioned within the support body cavity. The first upper camera 52-2A is located at the upper end 126 of the support module 53-2 and the second lower camera 52-2B located between the first upper camera 52-2A and the opposite lower end 128 of the support module 53-2. Both cameras 52-2A, 52-2B are pointed in the same direction, i.e., towards the body 20 of the drone 12. For example, the viewing direction 118A of the first ultra-wide angle lens camera 52-2A and the viewing direction 118B of the second ultra-wide angle lens cameras 52-2B are each orientated towards the fuselage body 20 with the viewing direction 118B of the second ultra-wide angle lens cameras 52-2B orientated away from the viewing direction 118A of the first ultra-wide angle lens cameras 52-2A. This arrangement provides an overlapping vertical field angle $\alpha_{sROI-2}$, as shown.

Figure 18B:
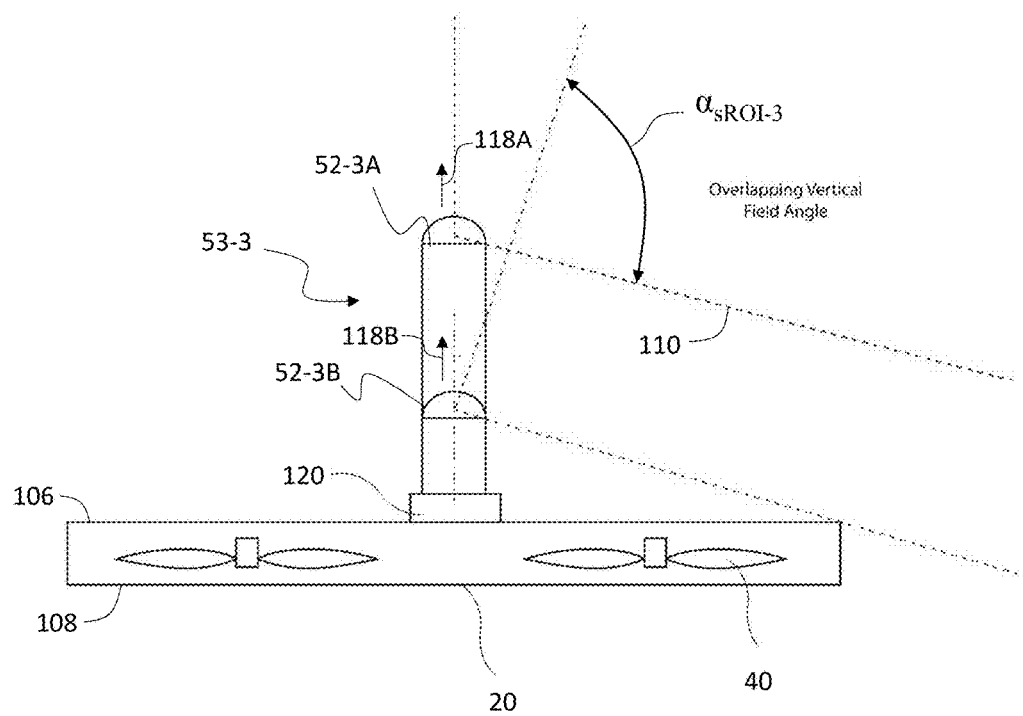
FIG. 18B is a diagrammatic illustration of an aerial system including an obstacle detection and avoidance system, according to a second alternative embodiment of the present invention.

With reference to FIG. 18B, a second alternative embodiment of the support module 53-3 is shown. In this embodiment, the support module 53-3 includes a first upper camera 52-3A located at the upper end 126 of the support module 53-3 and a second lower camera 52-3B located between the upper camera 52-3A and the opposite end 128 of the support module 53-3. Both cameras 52-3A, 52-3B are pointed in the same direction, i.e., upwards, away from the body 20 of the drone 12. For example, the viewing direction 118A of the first ultra-wide angle lens camera 52-3A and the viewing direction 118B of the second ultra-wide angle lens cameras 52-3B are each orientated away from the fuselage body 20 with the viewing direction 118A of the first ultra-wide angle lens cameras 52-3A orientated away from the viewing direction 118B of the second ultra-wide angle lens cameras 52-3B. This arrangement provides an overlapping vertical field angle $\alpha_{sROI-3}$, as shown.

With reference to FIG. 19, a second alternative embodiment of the support assembly including a first support module 53-4A and a second support module 53-4B is shown. In this embodiment, the first support module 53-4A extends outwardly from the top portion 106 of the fuselage body 20 and includes the first upper camera 52-4A located at an upper end of the first support module 53-4A. The second support module 53-4B extends outwardly from the bottom portion 108 of the fuselage body 20 and includes the second lower camera 52-4B located at the lower end of the second module 53-4B as shown. The upper end of the first support module 53-4A is located on one side of the body 20 and the lower end of the second support module 53-4B is located at on the other side of the body 20. Both cameras 52-4A, 52-4B are pointed in the same direction, i.e., downwards. For example, the viewing direction 118A of the first ultra-wide angle lens camera 52-4A is oriented towards the fuselage body 20 and the viewing direction 118B of the second ultra-wide angle lens cameras 52-4B is orientated away from the fuselage body 20 with the viewing direction 118B of the second ultra-wide angle lens cameras 52-4A orientated away from the viewing direction 118A of the first ultra-wide angle lens cameras 52-4B. This arrangement provides an overlapping vertical field angle $\alpha_{sROI-4}$, as shown.

INDUSTRIAL APPLICABILITY

Figure 26:
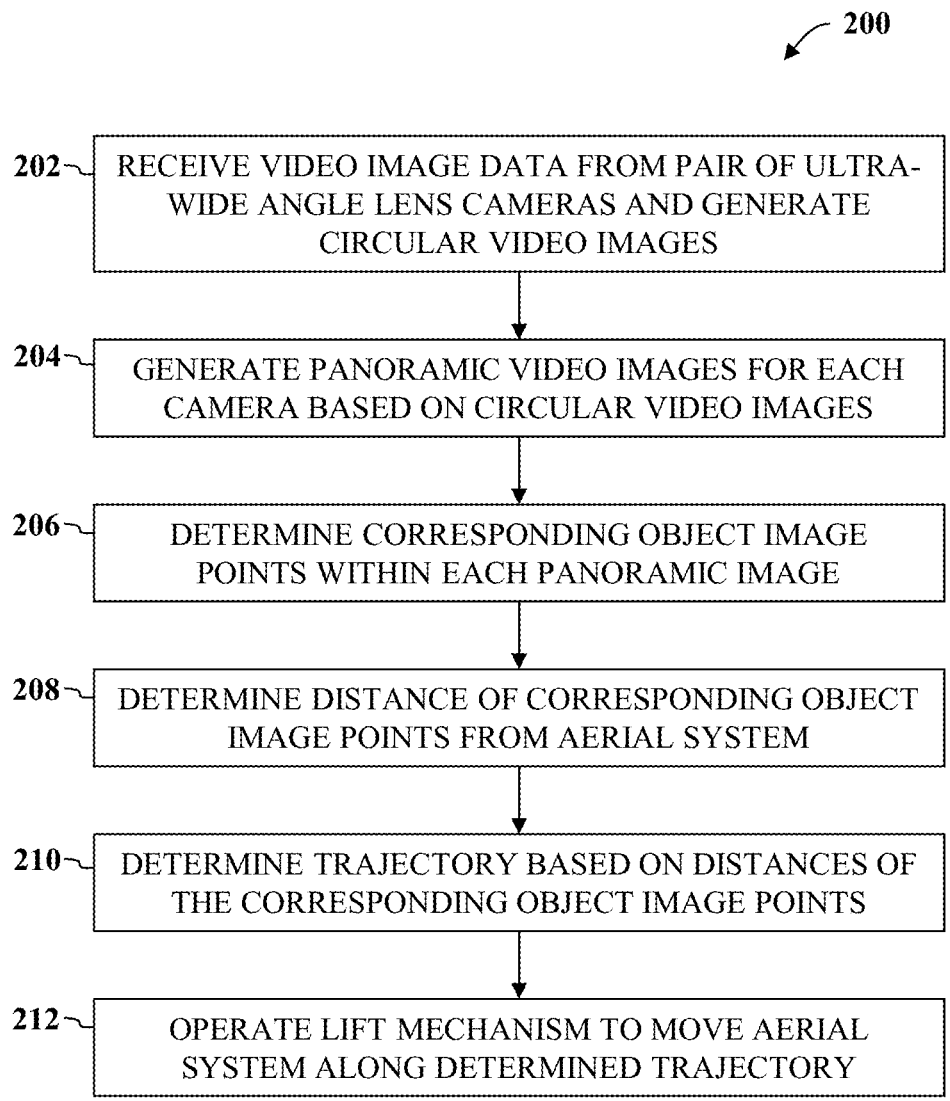
FIG. 26 is a flowchart of a method of operating an aerial system including an obstacle detection and avoidance system, according to an embodiment of the present invention.

FIG. 26 is a flowchart of method 200 that may be used with the system 10 for operating the aerial system 12 including the obstacle detection and avoidance system 50. Each method step may be performed independently of, or in combination with, other method steps. Portions of the methods may be performed by any one of, or any combination of, the components of the system 10. In the illustrated embodiment, in method step 202, the processor of the vision processing system 56 includes is programmed to receive video image data from each of the ultra-wide angle lens cameras 52A, 52B and generate circular video images (shown in FIG. 22) associated with each ultra-wide angle lens camera 52A, 52B. For example, in one embodiment the ultra-wide angle lens cameras 52A, 52B include a fish-eye camera lens having a 360° horizontal angle of view and a vertical angle of view greater than 180°. Studies on omnidirectional vision sensors with a large field of view have shown a superiority in sensing of surrounding and scene analysis. Fish-eye lens provides a remarkable large FOV (nearly 180°) compared with a standard lens. Using the fish-eye lens mounting camera (fish-eye camera), all-direction space in front of the lens is projected onto an image plane. Namely, by the projection image (fish-eye image), it is possible to handle a semispherical space in front of the fish-eye camera. As such, an extreme wide measurable space is an advantage of the fish-eye camera. So it is expected that the fish-eye camera produces a novel and creative possibilities of image application.

Using stereo fish-eye, a novel stereo system which can achieve omnidirectional obstacle sensing has been created. The principle of detailed flow of the stereo fish-eye will be described as follows.

Generic fish-eye camera model: The perspective projection of a pinhole camera can be described by the following formula:

$$r = f \cdot \tan\theta \quad (1),$$

where $\theta$ is the angle between the principal axis and the incoming ray, r is the distance between the image point and the principal point and f is the focal length. Several fish-eye lenses models were usually suggested for fish-eye lenses (or rather, the opposite: fish-eye lenses are constructed in order to satisfy such models)—stereographic, equidistance, equisolid angle and Orthographic projection:

$$r = 2f \cdot \tan(\theta/2) \quad (2)$$

$$r = f \cdot \theta \quad (3)$$

$$r = 2f \cdot \sin(\theta/2) \quad (4)$$

$$r = f \cdot \sin\theta \quad (5)$$

Figure 21A:
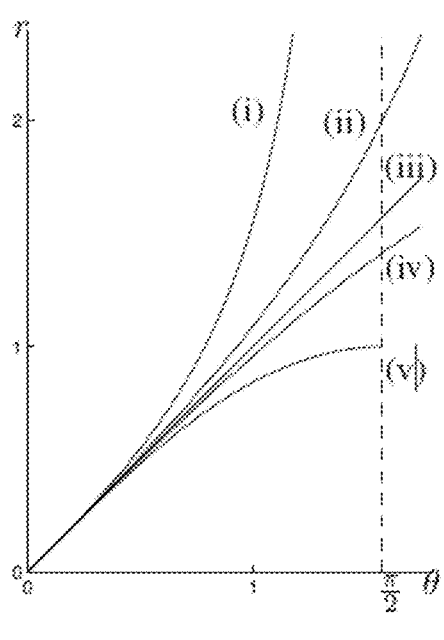
FIGS. 21A-21B are drawings illustrating the behavior of the different projections and the difference between a pinhole camera and a fish-eye camera.
Figure 21B:
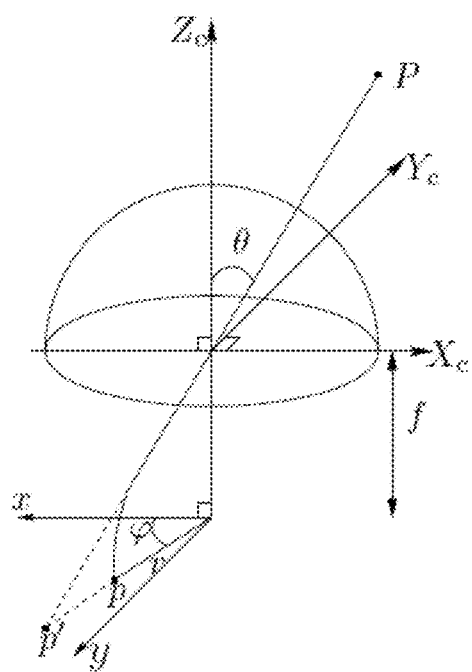

The behavior of the different projections is illustrated in FIG. 21A and the difference between a pinhole camera and a fish-eye camera is shown in FIG. 21B. FIG. 21A shows Projection (1)-(5) with f=1. FIG. 21A shows a fish-eye camera model, where the image of the point P is p whereas it would be p' by a pinhole camera.

For perspective cameras, Equation (1) maps the incidence angle $\theta$ to the radius r given the focal length f. For fish-eye cameras, this mapping is no more valid. The f-theta mapping or equiangular or equidistance projection maintains angular distance. The stereographic projection preserves circularity and thus project 3D local symmetries onto 2D local symmetries. The orthogonal or sine law projection maintains planar illuminance. The equisolid angle projection maintains surface relations. Every pixel subtends an equal solid angle, or an equal area on the unit sphere. For this disclosure, f-theta lens or stereographic fish-eye lenses are recommended since they can better preserve information (do not compress too much) of peripheral objects. For demonstration purpose, we illustrate a depth sensing algorithm under f-theta lens assumption (Eq. 3). For other types of lens model or practical models with radial distortion, the overall general procedure for omnistereo depth sensing described below can still be followed with minor modification on the lens modeling part.

Fish-eye camera calibration: The three parameters ($f\mu$, u0, v0) of fish-eye model can be determined easily, without calibration pattern, simply considering an ordinary fish-eye image such as the one on FIG. 22. As pixels are squared, we assume the world projection on the CCD sensor to be a circle. Others pixels are black which allow us to determinate easily which pixel belongs to the circle. We simply use different classical image processing methods to estimate the parameters of the circle that will be enough for the calibration.

First of all, extraction of the circle border is preferably performed with a Canny filter. Afterwards, the position of the center and the radius of the circle may be determined with various methods:

Barycenter of the no-black (internal) pixels,
Best fitting circle by mean squared estimation
Hough circular transformation The center of the circle gives the position of the optical center projection on the image (u0, v0). The circle radius $r_c$, already in pixel units, is used to estimate the $f_u$ parameter the following way: for all pixels, the distance r between pixel position and center of the image is proportional to the angle $\theta$ ($r = f \cdot \theta$). This is also true for external values, and $\theta_{max}$ is half of the aperture angle of the fish-eye (given by the manufacturer). This leads to the result:

$$f_u = \frac{r_c}{\theta_{max}}$$

This method is simple and robust. In addition, using different, random-kind of images, does not affect the numerical results. Moreover, if the circle is truncated (which can happen for different camera-lens parameters), it still works (determination of radius of circle). It can also be extended to non-squared pixels, replacing the determination of circle by ellipse.

In method step 204, the processor of the vision processing system 56 is programmed to generate panoramic video images based on the generated circular video images. For example, the processor generates a first panoramic image associated with the first ultra-wide angle lens cameras 52A and generates and a second panoramic image associated with the second ultra-wide angle lens cameras 52B. FIG. 23A shows the epipolar lines for a pair of coaxial omnidirectional images are radial lines. FIG. 23B illustrates when the images are projected onto a panorama the epipolar lines become parallel.

Panoramic fish-eye image: An important part of any stereo system is the epipolar constraint. This constraint reduces the problem of finding corresponding points to a 1-D search. For omnidirectional sensors, corresponding points must lie on conics (epipolar curves). However, when the circle images are vertically aligned such that the vertices and focal points are coaxial, the curves reduce to radial lines (see FIG. 23). Once the image is projected onto a cylinder (panoramic image) the epipolar lines become parallel. If each image in the stereo pair is projected onto a cylinder of the same size, the epipolar lines will match up.

The projection from 3D rays to 2D image positions in a fish-eye lens can be approximated by the imaginary equidistance model.

Figure 24A:
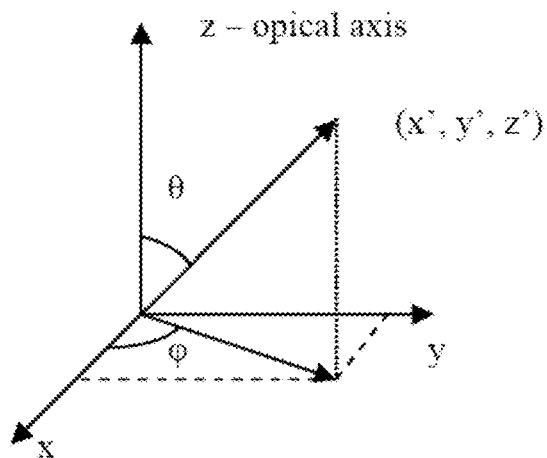
FIGS. 24A-24C illustrate different camera coordination systems and their relationship to the angles θ, φ.
Figure 24B:
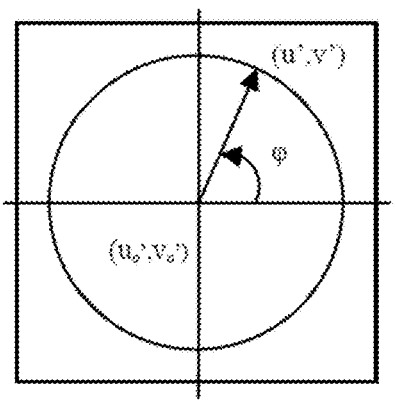
Figure 24C:
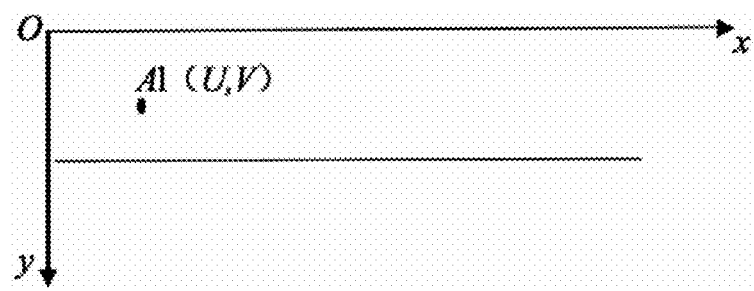

FIG. 24A illustrates a camera coordination system and its relationship to the angles $\theta$, $\varphi$. FIG. 24B illustrates the relationship from polar coordinates r, $\varphi$ to orthogonal coordinates (u',v'). FIG. 24C illustrates the unwarped panoramic image of fisheye image. For example, let a 3D ray from P of the lens is specified by two angles $\theta$ and $\varphi$ (FIGS. 24A-24C).

Together with the angle $\varphi$ between the light ray reprojected to xy plane and the x axis of the camera centered coordinate system, the distance r is sufficient to calculate the pixel coordinates:

$$u' = r \cdot \cos\varphi$$

$$v' = r \cdot \sin\varphi$$

The relation between the angle of incidence and the resulting distance of the image point from the principle point is constant for the whole image. Consequently, the following relation can hold as basic equation for the fish-eye projection:

$$\frac{\theta}{r} = \frac{\theta_{max}}{R}$$

-continued where  $\theta$ = angle of incidence
r = distance between image point and optical axis
R = image radius
$\theta_{max}$ = half of the max fov of fisheye lens In order to unwarp the circle fish-eye image to panoramic image, the relation between the point A(U, V) on the panoramic image and the angles θ, φ can be described:

$$\varphi = \frac{2U}{R_{max}}$$

$$\theta = \frac{V \cdot \theta_{max}}{R}$$

$$u' = u_0 + V \cos \varphi$$

$$v' = v_0 + V \sin \varphi$$

In method step 206, the processor of the vision processing system 56 is programmed to determine corresponding object image points within the first panoramic image and the second panoramic image. For example, in one embodiment the processor of the vision processing system 56 implements stereo matching to determine the corresponding object image points.

Figure 25:
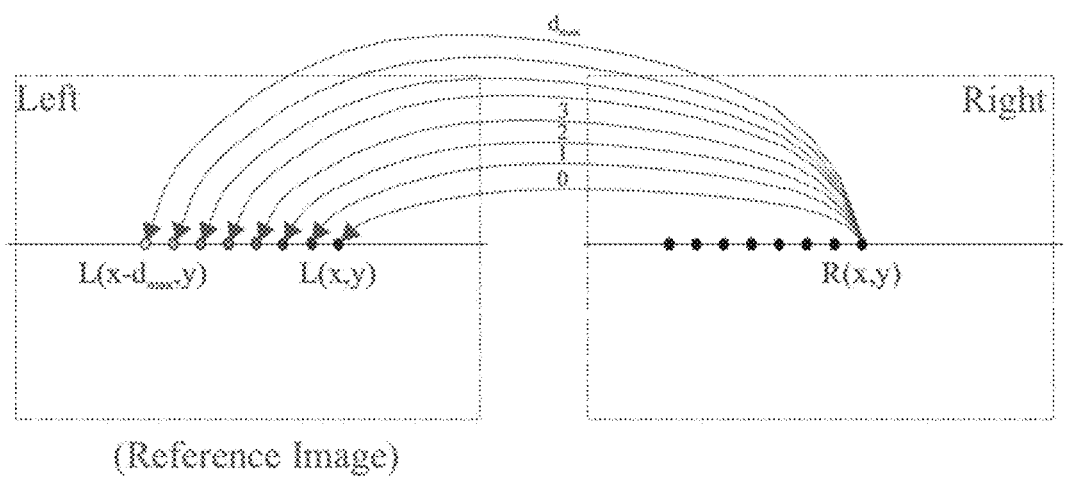
FIG. 25 illustrates a method of finding potential matches in a reference image along the epipolar lines.

FIG. 25 illustrates a process of finding potential matches in the reference image along the epipolar line. Stereo matching: Stereo matching is used for finding the similarity between pixels by comparing windows around pixels of interest in a pair of images (FIG. 25), which allows 3D reconstruction by triangulation, using the known intrinsic and extrinsic orientation of the cameras. In recent years, many stereo matching algorithms have been proposed. Stereo matching algorithms can be classified into local and global algorithms. Local algorithms compute each pixel's disparity value in the light of the intensity values within a window of finite size. However, global algorithms explicitly assume an energy function with data and smoothness energy terms. It regards stereo matching as an energy minimization problem and obtains global disparity allocation via optimization methods such as graph cuts, belief propagation and so on. Typically, global methods achieve more accurate disparity maps with higher computational complexity, whereas local methods are more efficient and easy to implement in the real-world systems.

After comparing various local matching algorithms, we were able to obtain acceptable disparity maps with the block matching (BM) method, which can find subpixel matches in real time. Note that valid disparity values must be positive and they are given with respect to the reference image. An advantage of the block (window) search for correspondences is that it can be narrowed along epipolar lines. Unlike the traditional horizontal stereo configuration, our system captures panoramic images whose views differ in a vertical fashion.

Popular similarity measures include the sum of absolute differences (SAD), the sum of squared difference (SSD), and the normalized cross correlation (NCC). The preferred method NCC handles radiometric differences like bias and gain changes and assumes Gaussian noise in the values of corresponding pixels. The cost function of NCC is $$C(p, d) = \frac{\Sigma_{(x,y) \in W_p}(I_1(x, y) - \overline{I_1}(p_x, p_y)) \cdot (I_2(x+d, y) - \overline{I_2}(p_x+d, p_y))}{\sqrt{\Sigma_{(x,y) \in W_p}(I_1(x, y) - \overline{I_1}(p_x, p_y))^2 \cdot \Sigma_{(x,y) \in W_p}(I_2(x+d, y) - \overline{I_2}(p_x+d, p_y))^2}}$$

where $I_1$ is left image pixel, $I_2$ is right image pixel, $W_p$ is the matching window size, $p(p_x, p_y)$ is the center of the window. (x, y) is the target matching position in the left image, and d is the searching offset along the searching line.

In method step 208, the processor of the vision processing system 56 is programmed to determine a distance of each corresponding object image point from the optical axis. In one embodiment, the processor of the vision processing system 56 implements a computation of stereo depth.

Figure 20:
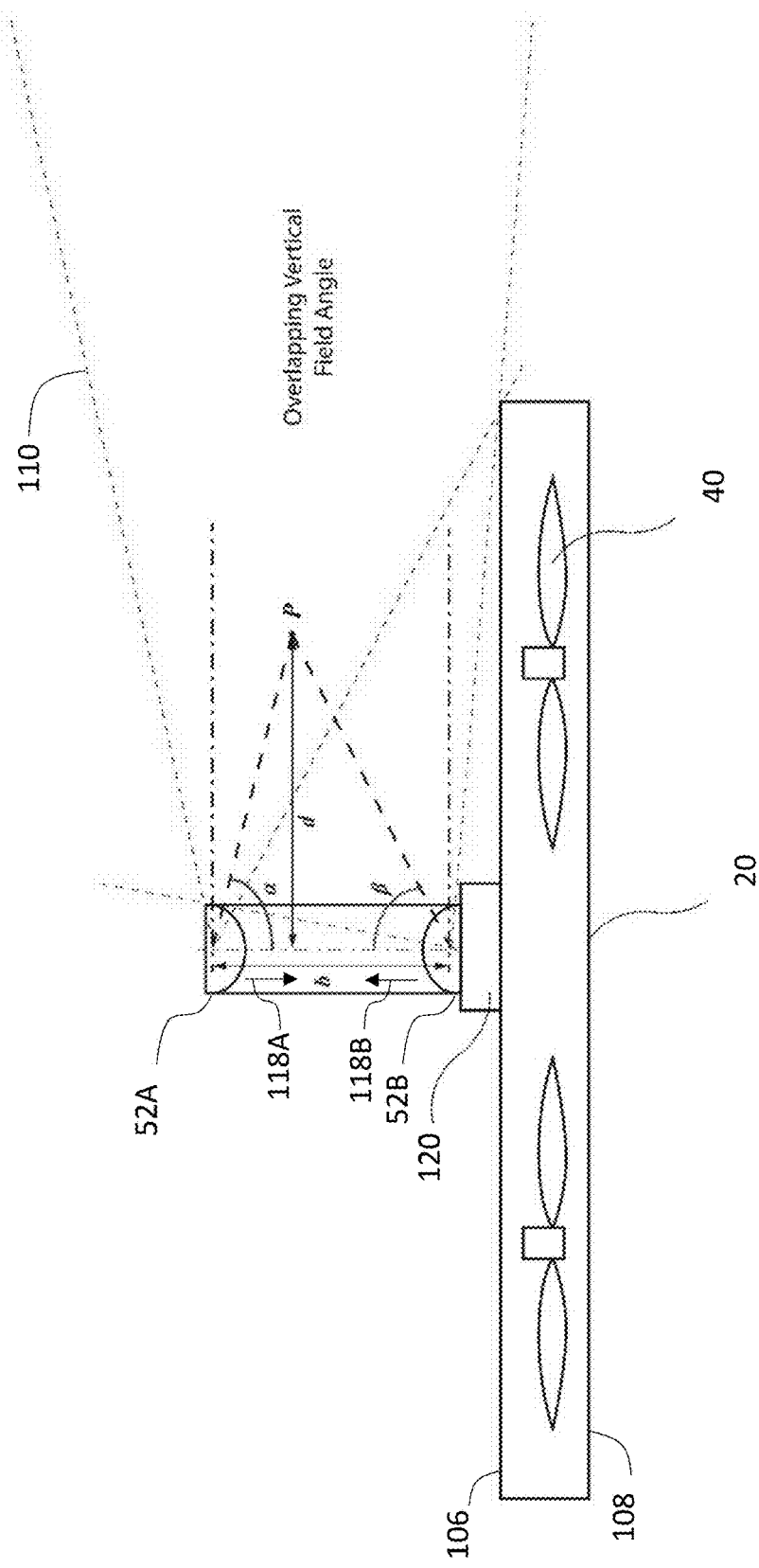
FIG. 20 is a third diagrammatic illustration of the aerial system of FIG. 13.

Computation of Stereo Depth: FIG. 20 illustrates the basic triangulation on a coaxial omnistereo system. Once correspondence between image points has been established, depth computation by triangulation is straightforward. As shown in FIG. 20, two incident angles of the corresponding image points can be defined by the angles α and β. From the law of sines, depth d is computed as:

$$d = \frac{\sin(\beta)\sin(\alpha)}{\sin(\pi - \alpha - \beta)} b$$

where b is the baseline of the stereo system. Letting r and r' be the distances of the image points from the center of the fisheye image, then the angles α and β are determined by, $$\alpha = \frac{\theta_{max}}{R} r$$

$$\beta = \frac{\theta_{max}}{R} r'$$

where R are the radii of the fisheye image, $\theta_{max}$ is the half of the max fov of lens. Note that in contrast to traditional stereo, depth computation is independent of the focal length of the camera (due to orthographic projection).

Alternatively, distance can be defined as a function of disparity in the panoramic image. If v and v' are the heights of corresponding points in the top and bottom panoramic images, the angles α and β alse can be described as:

$$\alpha = \frac{\theta_{max}}{R} v$$

$$\beta = \frac{\theta_{max}}{R} v'$$

Thus, the depth can be determined by the disparity v-v'.

In method step 210, the processor of the vision processing system 56 is programmed to transmit data associated with the determined corresponding object image points to the application processing system 60 for use in generating a flight trajectory. The application processing system 60 is programmed to determine a trajectory based on the distance of each corresponding object image point from the optical axis.

In method step 212, the application processing system 60 is programmed to operate the lift mechanism 40 to move the aerial system along the determined trajectory.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

What is claimed is:

1. An aerial system, comprising:
a fuselage body;
a lift mechanism coupled to the fuselage body; and
an obstacle detection system including a pair of ultra-wide angle lens cameras coupled to the fuselage body, each ultra-wide angle lens camera including a field-of-view lens having a vertical angle of view greater than 180 degrees, the pair of ultra-wide angle lens cameras being orientated such that a portion of each corresponding camera field-of-view overlaps to define a viewable region of interest including an overlapping vertical field angle; and
a processor coupled to the pair of ultra-wide angle lens cameras, the processor programmed to:
receive video image data from each of the ultra-wide angle lens cameras and generate circular video images associated with each ultra-wide angle lens camera;
generate panoramic video images based on the generated circular video images including a first panoramic image associated with a first camera of the pair of ultra-wide angle lens cameras and a second panoramic image associated with a second camera of the pair of ultra-wide angle lens cameras;
determine corresponding object image points within the first panoramic image and the second panoramic image;
determine a distance of each corresponding object image point from the optical axis;
determine a trajectory based on the distance of each corresponding object image point from the optical axis; and
operate the lift mechanism to move the aerial system along the determined trajectory.

2. The aerial system of claim 1, wherein each ultra-wide angle lens camera includes an optical center point orientated coaxially along an optical axis.

3. The aerial system of claim 2, wherein the obstacle detection system includes a support assembly extending outwardly from the fuselage body and coupled to each of the ultra-wide angle lens cameras.

4. The aerial system of claim 3, wherein the support assembly includes a support body extending between a first end and a second end along a centerline axis, the pair of ultra-wide angle lens cameras includes a first camera and a second camera orientated along the centerline axis, the second camera being positioned between the first camera and the fuselage body.

5. The aerial system of claim 4, wherein a viewing direction of the first camera is orientated towards a viewing direction of the second camera.

6. The aerial system of claim 4, wherein each of the first camera and the second cameras has a viewing direction orientated towards the fuselage body.

7. The aerial system of claim 4, wherein each of the first camera and the second camera has a viewing direction orientated away from the fuselage body.

8. The aerial system of claim 4, wherein the support body includes an inner surface that defines a support body cavity extending between the first end and the second end, the pair of ultra-wide angle lens cameras being positioned within the support body cavity.

9. The aerial system of claim 2, wherein the pair of ultra-wide angle lens cameras includes a first camera coupled to a top portion of the fuselage body and a second camera coupled to an opposite bottom portion of the fuselage body.

10. The aerial system of claim 9, wherein a viewing direction of each of the first camera and the second camera is orientated away from the fuselage body.

11. The aerial system of claim 9, wherein a viewing direction of the first camera is orientated towards the top portion of the fuselage body and a viewing direction of the second camera is orientated away from the bottom portion of the fuselage body.

12. An obstacle detection system for use with an aerial system, the aerial system including a fuselage body and a lift mechanism coupled to the fuselage body, the obstacle detection system comprising:
a support assembly adapted to be coupled to the fuselage body; and
a pair of ultra-wide angle lens cameras coupled to the support assembly and orientated coaxially along an optical axis, wherein each ultra-wide angle lens camera includes a field-of-view lens having a vertical angle of view greater than 180 degrees, and wherein the pair of ultra-wide angle lens cameras is orientated such that a portion of each corresponding camera field-of-view overlaps to define a viewable region of interest including an overlapping vertical field angle; and a processor coupled to the pair of ultra-wide angle lens cameras, the processor programmed to:

receive video image data from each of the ultra-wide angle lens cameras and generate circular video images associated with each ultra-wide angle lens camera;

generate panoramic video images based on the generated circular video images including a first panoramic image associated with a first camera of the pair of ultra-wide angle lens cameras and a second panoramic image associated with a second camera of the pair of ultra-wide angle lens cameras;

determine corresponding object image points within the first panoramic image and the second panoramic image;

determine a distance of each corresponding object image point from the optical axis;

determine a trajectory based on the distance of each corresponding object image point from the optical axis; and operate the lift mechanism to move the aerial system along the determined trajectory.

13. The obstacle detection system of claim 12, wherein the support assembly extending outwardly from the fuselage body and coupled to each of the ultra-wide angle lens cameras.

14. The obstacle detection system of claim 13, wherein the support assembly includes a support body extending between a first end and a second end along a centerline axis, the pair of ultra-wide angle lens cameras includes a first camera and a second camera orientated along the centerline axis, the second camera being positioned between the first camera and the fuselage body.

15. The obstacle detection system of claim 14, wherein a viewing direction of the first camera is orientated towards a viewing direction of the second camera.

16. The obstacle detection system of claim 14, wherein each of the first camera and the second cameras has a viewing direction orientated towards the fuselage body.

17. The obstacle detection system of claim 14, wherein each of the first camera and the second camera has a viewing direction orientated away from the fuselage body.

18. The obstacle detection system of claim 12, wherein the pair of ultra-wide angle lens cameras includes a first camera coupled to a top portion of the fuselage body and a second camera coupled to an opposite bottom portion of the fuselage body.

19. The obstacle detection system of claim 18, wherein a viewing direction of the first camera is orientated towards the top portion of the fuselage body and a viewing direction of the second camera is orientated away from the bottom portion of the fuselage body.

20. An aerial system, comprising:

a fuselage body;

a lift mechanism coupled to the fuselage body; and an obstacle detection system including:

a support assembly adapted to be coupled to the fuselage body;

a pair of ultra-wide angle lens cameras coupled to the support assembly and orientated coaxially along an optical axis, wherein each ultra-wide angle lens camera includes a field-of-view lens having a vertical angle of view greater than 180 degrees, and wherein the pair of ultra-wide angle lens cameras is orientated such that a portion of each corresponding camera field-of-view overlaps to define a viewable region of interest including an overlapping vertical field angle; and a processor coupled to the pair of ultra-wide angle lens cameras, the processor programmed to:

receive video image data from each of the ultra-wide angle lens cameras and generate circular video images associated with each ultra-wide angle lens camera;

generate panoramic video images based on the generated circular video images including a first panoramic image associated with a first camera of the pair of ultra-wide angle lens cameras and a second panoramic image associated with a second camera of the pair of ultra-wide angle lens cameras;

determine corresponding object image points within the first panoramic image and the second panoramic image;

determine a distance of each corresponding object image point from the optical axis;

determine a trajectory based on the distance of each corresponding object image point from the optical axis; and operate the lift mechanism to move the aerial system along the determined trajectory.

* * * * *